United States Patent [19]

Chapman et al.

[11] Patent Number: 4,677,386

[45] Date of Patent: Jun. 30, 1987

[54] METHOD OF INTERPRETING IMPEDANCE DISTRIBUTION OF AN EARTH FORMATION OBTAINED BY A MOVING ARRAY USING END EMITTING CURRENT ELECTRODES SEQUENTIALLY ACTIVATED AND A SERIES OF POTENTIAL ELECTRODES

[75] Inventors: Carroll W. Chapman, Anaheim; Jorg A. Angehrn, Brea, both of Calif.

[73] Assignee: Chevron Research Company, San Francisco, Calif.

[21] Appl. No.: 761,125

[22] Filed: Jul. 31, 1985

[51] Int. Cl.$^4$ .............................................. G01V 3/18
[52] U.S. Cl. .................................. 324/366; 324/347; 364/422
[58] Field of Search ............... 324/323, 339, 341, 347, 324/366, 373, 375; 364/422

[56] References Cited

U.S. PATENT DOCUMENTS

| | | | |
|---|---|---|---|
| 3,076,138 | 1/1963 | Stelzer | 324/366 |
| 3,256,480 | 6/1966 | Runge et al. | 324/366 |
| 3,457,499 | 7/1969 | Tanguy | 324/323 |
| 3,882,376 | 5/1975 | Schuster | 324/373 |
| 4,087,740 | 5/1978 | Suau | 324/373 |
| 4,087,741 | 5/1978 | Mufti | 324/366 |
| 4,122,387 | 10/1978 | Ajam et al. | 364/422 X |
| 4,340,934 | 7/1982 | Segesman | 364/422 |
| 4,361,808 | 11/1982 | Kern et al. | 324/366 |
| 4,412,180 | 10/1983 | Desbrandes | 324/373 |
| 4,472,307 | 9/1984 | Bravenec | 324/373 |
| 4,535,625 | 8/1985 | Lyle, Jr. | 364/422 X |

FOREIGN PATENT DOCUMENTS 7202540 9/1972 Netherlands .................... 324/373

OTHER PUBLICATIONS

Runge et al., "Ultra-Long Spaced Electric Log(UL-SEL)", *The Log Analyst*, Sep.-Oct., 1969, pp. 20-30.

*Primary Examiner*—Reinhard J. Eisenzopf
*Assistant Examiner*—Warren S. Edmonds
*Attorney, Agent, or Firm*—S. R. LaPaglia; E. J. Keeling; H. D. Messner

[57] ABSTRACT

The response characteristics of a combination of hole-centered electric logging tools in a variety of borehole conditions can be obtained by means of impedance values as entries of a matrix resulting from measurements over a series of depth increments, utilizing an array of M electrode assemblies of equal incremental spacing positioned on a rigid mandrel. While the array moves continuously along the borehole, currents are emitted independently and sequentially from first one and then the other of current electrodes located at the shallow and deep ends of the array, allowing the impedance matrix to be formed by the principle of linear superposition in terms of voltage and voltage difference measurements between adjacent electrodes. The impedance matrix is inverted and used to generate a set of tool responses, which when properly compared to a set of tool responses previously generated by computer simulation and addressable by sets of borehole parameters and calibration factors, allows the corresponding borehole conditions to be deduced from the measured data.

14 Claims, 28 Drawing Figures

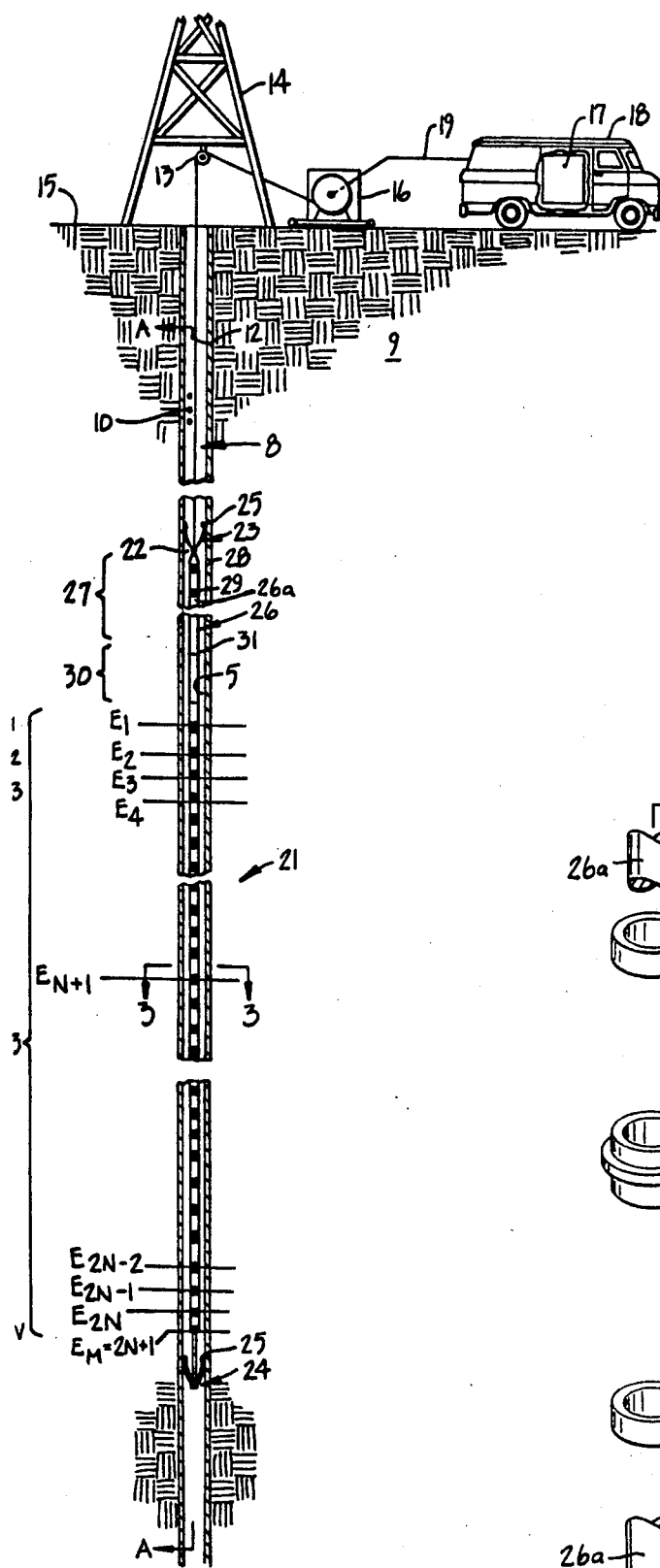
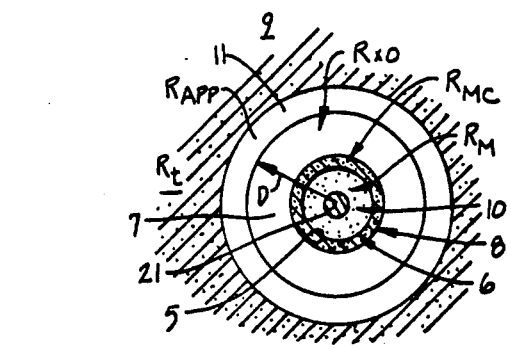
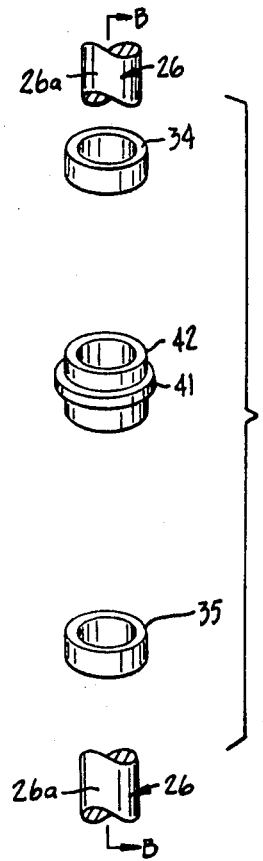
FIG.1
FIG.3
FIG.2

METHOD OF INTERPRETING IMPEDANCE DISTRIBUTION OF AN EARTH FORMATION OBTAINED BY A MOVING ARRAY USING END EMITTING CURRENT ELECTRODES SEQUENTIALLY ACTIVATED AND A SERIES OF POTENTIAL ELECTRODES

RELATED APPLICATIONS

Our applications filed concurrent with and related to the subject application and incorporated herein by reference, include the following:

| TITLE | Serial No. | FILING DATE |
|---|---|---|
| METHOD OF LOGGING AN EARTH FORMATION PENETRATED BY A BOREHOLE TO PROVIDE AN IMPROVED ESTIMATE OF IMPEDANCE DISTRIBUTION OF THE FORMATION; | 761,122 | July 31, 1985 |
| METHOD OF INTERPRETING IMPEDANCE DISTRIBUTION OF AN EARTH FORMATION USING PRECURSOR LOGGING DATA PROVIDED BY A MULTI-ELECTRODE LOGGING ARRAY STATIONARY WITHIN A BOREHOLE; | 761,123 | July 31, 1985 |
| METHOD OF LOGGING AN EARTH FORMATION PENETRATED BY A BOREHOLE TO PROVIDE AN IMPROVED ESTIMATE OF IMPEDANCE DISTRIBUTION WITH DEPTH USING A SINGLE CONTINUOUSLY EMITTING CURRENT ELECTRODE AND A MULTIPLICITY OF POTENTIAL ELECTRODES OF A MOVING LOGGING ARRAY; | 761,126 | July 31, 1985 |
| METHOD OF INTERPRETING IMPEDANCE DISTRIBUTION OF AN EARTH FORMATION PENETRATED BY A BOREHOLE USING PRECURSOR DATA PROVIDED BY A MOVING LOGGING ARRAY HAVING A SINGLE CONTINUOUSLY EMITTING CURRENT ELECTRODE AND A MULTIPLICITY OF POTENTIAL ELECTRODES; | 761,127 | July 31, 1985 |
| METHOD OF LOGGING AN EARTH FORMATION PENETRATED BY A BOREHOLE TO PROVIDE AN IMPROVED ESTIMATE OF IMPEDANCE DISTRIBUTION WITH DEPTH USING END EMITTING CURRENT ELECTRODES SEQUENTIALLY ACTIVATED AND A MULTIPLICITY OF POTENTIAL ELECTRODES OF A MOVING LOGGING ARRAY. | 761,124 | July 31, 1985 |

SCOPE OF THE INVENTION

This invention relates to downhole electrical logging methods and apparatus for carrying out same, and more particularly to a method of processing precursor logged voltage and current data so as to systematically provide for improved interpretation of resistivity of an earth formation in and around the borehole even though the precursor data have been measured by a continuously moving multi-electrode array using a pair of sequentially activated end current electrodes and a multiplicity of equi-spaced potential electrodes.

In one aspect of the invention, processing of the field data involves using a surprisingly accurate reciprocal impedance matrix indexed to a series of predetermined, but overlapping depth scan increments, to generate a series of synthetic responses that can be associated with a surprisingly large number of computer-generated arrays. From the synthetic responses, a comparison can be easily made to the responses of similar arrays in known borehole and formation conditions and—as a consequence—the true resistivity (Rt) of the formation as well as the resistivity (Rxo) of the invaded zone, can be determined. In accordance with another aspect of the invention, such comparison involves constraining the reciprocal impedance matrix so as to simulate lateral and vertical changes in formation resistivity akin to that provided by a number of modern focused logging arrays but for which a known data base for comparison has previously been generated.

BACKGROUND OF THE INVENTION

From a knowledge of the voltage distribution in earth formation penetrated by a borehole resulting from imposed current flow in the formation, hydrocarbon saturation of the formation can be determined. Rock matrices are generally nonconductors of electricity. But if the formation is porous and contains fluids, current can be driven through the formation, and the voltage distribution along the borehole measured. The impedance of the formation relates to its ability to impede the flow of current through the formation, and is measured in ohms. The resistivity of the formation also relates to the ability of the former to impede current flow but is measured not in ohms but in terms of ohm meter$^2$ per meter or ohm-meter. That is to say, the resistivity of a formation is the impedance (in ohms) of a one meter by one meter by one meter cube of the formation when the current flows between opposite faces of the cube. Resistivities fall in the range from 0.2 to 1000 ohm-meter in most permeable earth formations we are familiar with.

Since the formation to be logged is penetrated by a borehole containing a fluid having a resistivity other than that of the adjacent formation, the obtained apparent resistivity (Ra) can differ from the true resistivity (Rt) of the formation. That is to say, the presence of the borehole filled with a fluid having a resistivity Rm different from that of the formation, the fact that the drilling fluid filtrate invades the formation to a limited degree and flushes away formation water and some hydrocarbons to establish a resistivity Rxo again different from that of the formation; and the fact that the measuring electrodes may cross into adjacent formations, all perturb the final results.

Certain electrical logging methods overcome such perturbations because of novel borehole conditions. For example, conventional resistivity logs (non-focused logs), provided by conventional electrical survey (ES) tools, provide good true resistivity estimates only in thick homogeneous beds having porosities greater than 15 percent. For thinner bed conditions, such tools can provide reliable results if filtrate invasion is shallow, if the true resistivity is low to moderate and if the resistivity of flushed zone is equal to or less than the true resistivity to be measured.

Additional more advanced logs have been developed to concentrate on enhancing the focusing properties of the electrical tools to overcome the above-mentioned perturbations. For example, families of resistivity tools have been developed in the last quarter century which use focusing currents to control the paths taken by the measuring current: among such tools, are the focusing logging tools including the spherically focused tool. Such tools use currents supplied to special electrodes on the tools and their readings are less affected by borehole conditions and the presence of adjacent beds.

But to an essential degree both types of logs have not been flexible enough under the varying borehole conditions encountered in today's production fields, on land or at sea. For example, conventional ES logs are too broadly structured to provide a way for a user to determine focusing response of electrical tools independent of electrode arrangement. Conversely, focused electrical logs are too strictly formulated to provide such independent results. That is, insufficient measurements are provided to yield results of focusing characteristics beyond that of the original configuration. In addition, calibration factors for deep and shallow focused tools appear to be chosen so that their responses are equal to the true formation resistivity in uninvaded formations having formation/mud resistivity contrasts in a range of 10/1 to 100/1 normalized to an eight-inch borehole. Hence in order for the user to have the option to test different focusing responses independent of electrode arrangement, he had to develop an entirely different logging method.

One such proposal is set forth in U.S. Pat. No. 3,076,138 for "Electrical Logging", R. B. Stelzer in which a multiple electrode array tool is used to provide voltage and current measurements that can be arranged in matrix format within a digital computer, as a function of depth along the borehole.

In the patent, the genesis of the matrix format is described in terms of a 2×3 array divided into six submatrices, one of which is a square array whose entries are surprisingly found to be independent of any later electrode arrangement to be synthesized. The above-mentioned square submatrix has rows which can be filled with raw field data values e.g., to identify the voltage at a common depth position and columns of values that can identify voltage responses at a series of voltage electrodes (including the current emitting electrode), as a function of common current electrode location.

It is believed that this proposal is the first to recognize that electrode logging data (viz., current, resistance and voltage) could be combined in such a matrix format.

In field operations, a bottom mounted current electrode is continuously energized as the sonde is moved through the borehole. Absolute voltage measurements at each of the series of uphole pickup electrodes (including the current emitting electrode) are sensed and recorded with respect to a remote uphole voltage reference electrode. A return current electrode is also mounted on the bridle of the tool, suitably located from the other electrodes, and the current from the emitting electrode is also measured and recorded. By dividing the measured absolute voltages by the corresponding measured current in accordance with Ohm's Law in matrix format, a resistance matrix R between arbitrary synthetic voltage and current values can be established. (Henceforth, matrix quantities will be underscored.) In principle, such a resistance matrix is suitable for synthesizing substantially the responses of conventional electric logging tools by manipulation of the matrix elements. Such operations specifically involve a submatrix as explained in more detail below, and is most important in the effectuation of the scheme in accordance with the proposal because of its basic property of allowing the synthetic currents to be uniquely determined from the corresponding voltage, or vice versa.

Also of importance in the practical implementation of the proposal is the recognition that it will generally be necessary to solve systems of equations involving the aforementioned submatrix, or what is equivalent to accurately computing the mathematical inverse of the submatrix to simulate responses of modern focused tools. That is to say, the solution of the reciprocal of such submatrix will be generally necessary for the synthesis of modern focused tools and especially for the synthesis of new and heretofore unknown electrode combinations requiring arbitrary voltage-current relationships. Thus, the above proposal is applicable only to those situations for which it is possible to produce the inverse of the submatrix with sufficient accuracy. But experience has indicated that in many field applications such results are not possible. The problem has to do with the numerical constraints imposed by the measurement process which ultimately result in finite limited precision of the voltage measurements, and has appeared with regularity in those field situations for which the formation to mud resistivity contrast is greater than 100 to 1 (viz., in situations where salty drilling fluids are used; where the uninvaded formation is of low porosity; and where there is moderate to high hydrocarbon saturation). It is believed the failure of the proposal to provide accurate results, has to do with the fact that in such high contrasts, the potential tends to change very slowly from electrode to electrode. Thus it has been impossible to preserve the required precision to accurately resolve the gradual variation involved. As a consequence, in subsequently manipulating matrix potential values, such as where floating point calculations specify differences in the potential between adjacent electrodes, the method of the proposal breaks down.

More recently, a second proposal has been put forth in U.S. Pat. No. 4,087,741 for "Downhole Geoelectric Remote Sensing Method", I. R. Mufti, in which a multiple electrode array tool is described for the detection of lateral resistive anomalies remote from the borehole. Typically, such anomalies are salt domes. This system uses the superposition principle to achieve synthesis of various four (4) electrode tools in the manner of extremely ultra long spaced electric logging tools (ULSEL)—see R. J. RUNGE ET AL, "Ultra-long Spaced Electric Log (ULSEL)", *THE LOG ANALYST*, Vol. 10, No. 5, September–October, 1969.

More specifically in this proposal, a center mounted current electrode array (viz., a current electrode with voltage sensing electrodes disposed symmetrically above and below the current electrode) is disposed on a bridle of ultra-long length. The current electrode is continuously energized at a low frequency as the bridle is moved through the borehole. Voltage differences between adjacent sensing electrodes above and below the current electrode are measured and recorded. The exclusive purpose of the tool: to synthesize various long-range, four-electrode tools for the detection of lateral anomolies. Since the voltage sensing electrodes are nonuniformly spaced, and since quantities related to the driving point resistance (i.e., the driving point impedance at the current emitting electrodes) are not measured, the proposal does not result in the type of matrix formulation provided by either the first-mentioned proposal or that provided by the present invention. That is to say, while the second proposal will allow calculations of potentials at given electrodes in presence of certain arbitrary currents at other electrodes, it will not allow the inverse calculations, i.e., the calculation of current at a given electrode position for given potentials at other electrode positions via a measured impedance matrix. It therefore cannot be used either in principle or in practice to synthesize other types of logging tools of interest in general.

RELATED APPLICATION

In our copending application for "METHOD OF LOGGING AN EARTH FORMATION PENETRATED BY A BOREHOLE . . . USING END EMITTING CURRENT ELECTRODES SEQUENTIALLY ACTIVATED AND A MULTIPLICITY OF POTENTIAL ELECTRODES . . . ", filed concurrently herewith, there is described in detail how to use the improved impedance matrix as provided by sequentially activated end emitting current electrodes in conjunction with a multiplicity of potential electrodes of a moving array. These steps included a substep of determining synthetic resistivity values that have been formulated using synthetic voltages generated from the precursor measured voltage and current values. Since the synthetic potential values are based in part on potential differences between adjacent pairs of electrode assemblies, the former are surprisingly accurate under all types of borehole conditions including those where resistivity contrasts of the formation and drilling mud are over 100:1.

However, there is a further need to accurately interrelate the differences in array responses other than by generation of a series of synthetic resistivity values to take into account—in a systematic manner—the variation in responses of such arrays as a function, for example, of drilling mud filtrate invasion and differing resistivity contrasts in and around the borehole penetrating the formation under survey.

SUMMARY OF THE INVENTION

In accordance with the present invention, a method is disclosed for synthesizing the true response characteristics of a combination of different hole-centered electric logging tools in a variety of difficult borehole conditions as provided by (1) determining impedance values of an earth formation penetrated by a borehole filled with a drilling mud of resistivity (Rm), and (2) selectively manipulating the impedance values as impedance entries of a matrix so as to synthesize operations of different hole-centered tools over an associated depth increment with surprising accuracy. Each of the impedance matrices is associated with a matrix gather indexed to one of a series of finite, overlapping depth scan increments of the formation measured along the borehole. Each scan increment is dependent on the array length L of the electrode array to define shallow and deep depth markers as well as being centrally indexed to the depth in the borehole of a mid-central electrode assembly of the array at the time of data collection.

In more detail, to provide a true indication of the formation resistivity (Rt) even though the formation is interspaced from the borehole by an invaded zone of resistivity (Rxo) of unknown lateral extent due to drilling and filtrate invasion, the following steps are carried out in sequence:

(1) An array of hole centered M electrode assemblies of equal incremental electrode spacing "a", is first calibrated to obtain sets of calibration factors normalized to known voltage initiation patterns and associated current response thereto in a known resistivity zone of response, the electrode assemblies having a known internally ordered numbering index, said sets of calibration factors each being addressable as a function of borehole conditions including said difficult borehole conditions as well as by synthetic computer focused array type;

(2) Next a field array is positioned in the borehole, the array comprising current activated shallow and deep end electrode assemblies each including a current electrode and a potential electrode, and a series of intermediate electrode assemblies each comprising a potential measuring electrode only. The absolute depth of at least one electrode assembly is continuously known with respect to a predetermined depth datum level measured from the earth's surface;

(3) Then the array is continuously moved along the borehole, and sequentially but rapidly current from first one and the other of said current electrodes of said shallow and deep end electrode assemblies, of a known value is injected through the drilling mud of resistivity (Rm) and the invaded zone of resistivity Rxo and thence into the formation of resistivity Rt, (4) During current injection from one and then the other of said current electrodes, the absolute potential at each potential electrode as well as the potential differences between adjacent pairs of potential electrodes is measured in a rapid manner wherein the potential measurements can be indexed to common logging stations of a series of equi-spaced logging stations located along the borehole having a spacing incremental distance of "a" where "a" is the distance between electrode assemblies;

(5) Then impedance values are calculated from the measured absolute and difference potential values and their associated injection currents, each value being indexed to said known internal indexing numbers of active current and potential electrodes used in the measurements;

(6) Next the impedance values are reindexed to form impedance entries of a series of overlapping modified matrix gathers $\Delta Z$, each gather $\Delta Z$ being associated with a predetermined segment of said formation equal in vertical extent to M logging stations, and comprising $M \times M$ impedance entries where M is the largest number of the numbering index of the electrode assemblies comprising the array;

(7) Then each matrix gather ΔZ is inverted to form the reciprocal modified matrix gather thereof $\Delta Z^{-1}$ in accordance with conventional matrix inversion techniques;

(8) After computer focused response parameters have been generated using the reciprocal matrix gather $\Delta Z^{-1}$ of step (7) in conjunction with the same voltage initiation patterns of step (1), sets of calibration factors also of step (1) are searched until the product of a particular set of calibration factors and the response parameters of step (7) for all synthetic tool array types is essentially a constant whereby the difficult borehole condition is deduced even in the presence of high true resistivity to mud resistivity contrasts and irrespective of the fact that synthetic sets of potential patterns have been used as initiators of the subsequently generated computer focused response parameters.

DESCRIPTION OF DRAWINGS

FIG. 1 is a partial side elevation of an earth formation penetrated by a borehole containing an electrical logging array and illustrating a method for processing estimates of the impedance distribution of the earth formation lateral to the borehole including a form of the invention in which the estimates are gained via a logging array continuously moving along the borehole as current and potential measurements occur at a series of logging stations indexed to depth positions denoting fixed depths in units of electrode spacing;

FIG. 2 is a detail of the terminating end electrode assembly of FIG. 1 illustrating constructional details of the current and potential electrodes comprising that assembly;

FIG. 3 is a section taken along the line 3—3 of FIG. 1 illustrating how detected measurements provided by the array can be used to deduce the resistivity characteristics of the formation as a function of offset distance even though the formation has undergone invasion by the drilling mud filtrate;

DESCRIPTION OF A PREFERRED EMBODIMENT OF THE INVENTION

Figure 4:
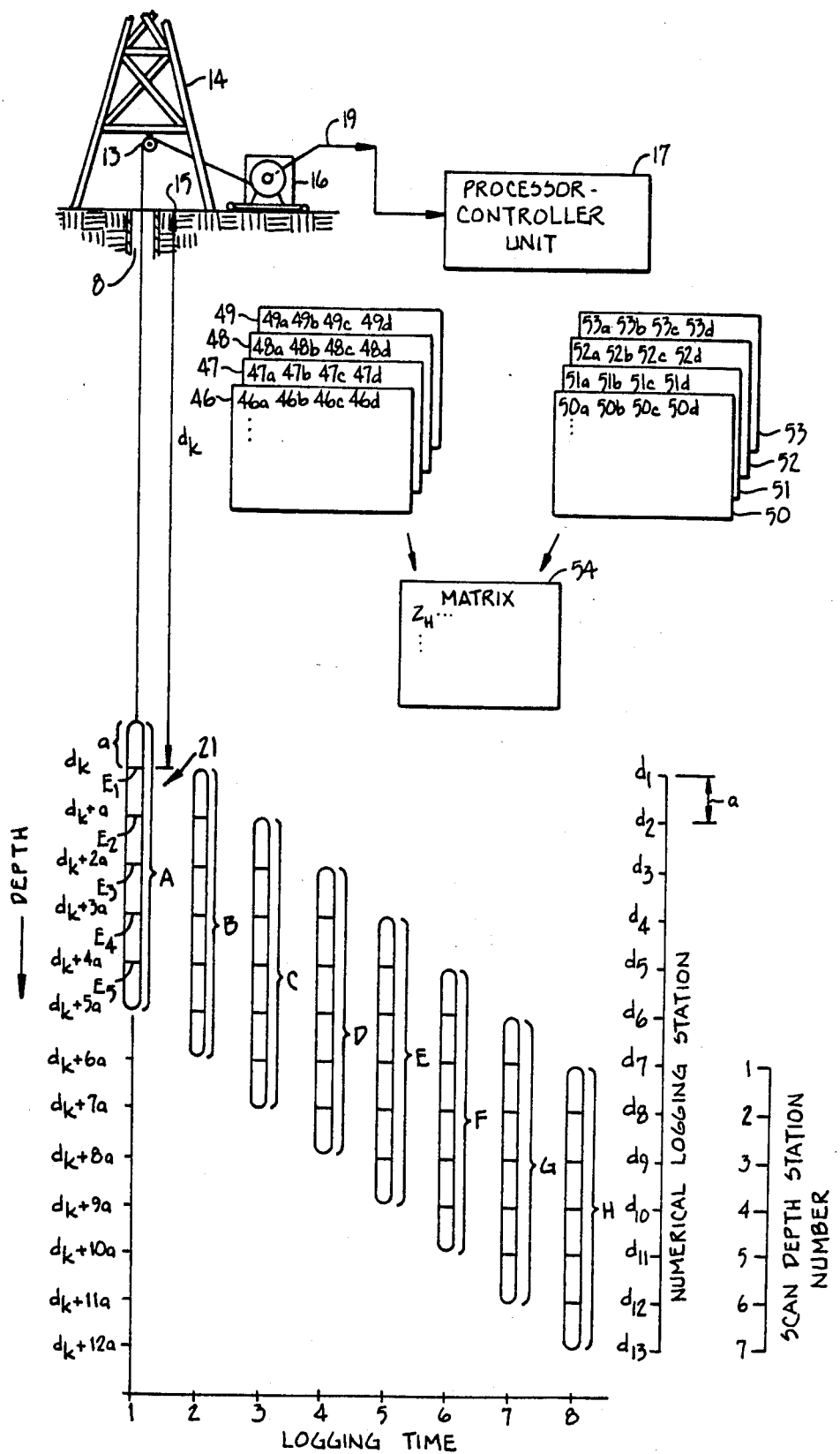
FIG. 4 is a schematic representation of the method of the present invention for systematically indicating the impedance distribution of the adjacent earth formation as an impedance matrix using a 5-electrode assembly array in which the indexing features of the final displays are detailed.

In the description that follows like elements are marked throughout the Specification and Drawings with the same reference numerals. The drawings are not to scale and certain features of the invention may be exaggerated in scale or operation in the interest of clarity or conciseness.

Referring to FIG. 1, a borehole 8 is shown penetrating a subsurface formation 9. Assume the borehole 8 contains a drilling mud 10. Purpose of the drilling mud 10: to carry chips away from the drill bit during drilling of the borehole 8 as well as to prevent collapse of the borehole as during drilling and production of the formation 9. Also suspended within the borehole 8 is a conductor cable 12 of conventional construction, i.e., multiple strands of flexible steel interlaced with a plurality of electrical conductors. The cable 12 is suspended within borehole 8 via pulley 13 attached to derrick 14 at the earth's surface 15 and thence to hoisting unit 16. Purpose of hoisting unit 16: to reel in or play out cable 12 within the borehole 8.

At the earth's surface 15, signals on the electrical conductors of the cable 12 pass through a slip ring assembly (not shown) on the hoisting unit 16 to a controller-processor circuit 17 within van 18, as via conductor 19. Downhole, such signals originate at and are a function of the operational characteristics of electric logging array 21 of the present invention.

ELECTRIC LOGGING ARRAY 21

Downhole, the cable 12 is attached to logging array 21 via a threaded plug 22. Above the plug 22 is a uphole centralizer 23. Below the array 21 is downhole centralizer 24. The centralizers 23 and 24 are similar in construction and each includes a series of spring loaded arms 25 which are biased radially outward into contact with sidewall 5 of the borehole 8. The arrangement of the centralizers 23 and 24 is similar to centralizers used in various types of logging and inspection tools and is for the purpose of locating the logging array 21 coincident with the axis of symmetry A—A of the borehole 8.

Logging array 21 is cylindrical in construction having a support structure defined by a mandrel 26. The mandrel 26 has an outer surface 26a. At the surface 26a are a series of electrode assemblies having an internal numbering index $E_1, E_2, \ldots E_{N+1} \ldots E_M$. In order that the adjacent assemblies be electrically isolated one from the other, an insulating material is fitted between each electrical assembly $E_1, E_2 \ldots E_M$ and the outer surface 26a of mandrel 26 as explained below. The array 21 is divided into three sections: (i) Uphole section 27 within which reside return current electrode 28 and reference potential electrode 29, the purpose of such electrodes 28 and 29 being to complete the current loop and to normalize potential measurements, respectively, as conventional in the electric logging art. If desired, the metallic strands of the cable 12 may also be used as the reference electrode as well as the return current electrode, as is also conventional in that art; (ii) Midsection 30 that contains threads 31 at its upper end for engagement with uphole section 27. Interior of midsection 30 are a series of slave control and measuring elements to be described in detail hereinafter, under control of master circuitry of controller-processor unit 17 at the earth's surface 15; and (iii) Downhole section 33 on which reside the series of electrode assemblies $E_1, E_2, \ldots E_M$, previously mentioned.

FIG. 2 shows the construction of the terminating electrode assemblies $E_1$ and $E_M$ in more detail.

As shown, each such assembly includes a current electrode member 34 and a potential sensing electrode 35, both of annular construction that fit the two ends of insulating member 42. Between the members 34 and 35 is an insulating member 41, which is part of member 42 and serves to keep electrodes 34 and 35 from being in physical contact with one another. Members 34, 35 and 42 are located about outer surface 26a of mandrel 26 concentric of the axis of symmetry B—B.

Note that when members 35 and 34 are attached in the manner depicted in FIG. 1 so as to function as potential and current electrodes, respectively, that they have widths in the vertical direction that are small compared to the axial spacing "a" between the electrode assemblies AND, in addition, they are so closely nested relative to the nearest electrode, that for purposes of axial resolution, their axial position is equivalent to single fixed depths $d_1$, and $d_v$ in FIG. 1.

With regard to the remaining electrode assemblies, $E_2, E_3, \ldots E_{m-1}$, the current electrode member 34 is not directly utilized in the present invention. Only the potential sensing electrode member 35 need be present. Thus, the current electrode member 34 can be considered as removed from the remaining assemblies $E_2, E_3, \ldots, E_{M-1}$.

With regard to the internal numbering order of the electrode assemblies, note that the shallowest assembly is assembly $E_1$ and the deepest assembly is $E_M$ and that the depth of any electrode assembly $E_1, E_2 \ldots E_M$ can be determined based on $$\text{Depth} = d_k + (p-1)a,$$

where p is 1, 2 ... M; $d_k$ is the absolute depth of the shallowest electrode assembly of the array; and M is the index of the deepest electrode assembly of the array.

OPERATIONS

Briefly, in accordance with the present invention, the purpose of logging array 21 is to provide an impedance distribution of the formation 9 such that such values preserve a one-to-one relationship between any subsequent combination of voltages and currents that could possibly be used to synthesize the response characteristics from any number of different electrical tools under a variety of difficult and different borehole and formation conditions. To achieve such a goal, the logging array 21 is operated in the manner depicted in FIG. 1 so that as current and potential values are systematically collected as function of depth, controller-processor circuit 17 at the earth's surface can selectively manipulate such values to form entries of a series of matrix gathers, each gather being exceedingly useful in synthesizing operations of different logging tools. Purpose: to provide a true indication of characteristics of formation 9 even though the formation may have been invaded by drilling mud filtrate in and around the borehole to an unknown extent as in the manner of FIG. 3, wherein or not synthetic sets of potential or sets of current values are later used as initiators of computer focused synthetic tool arrays.

That is to say, as shown in FIG. 3 note that the borehole 8 to be logged by logging array 21 can contain drilling mud 10 of resistivity Rm; that the drilling mud 10 can build up a mud cake 6 at sidewall 5 of the borehole 8; and that the mud facilitate can invade the formation 9 a distance D from the centerline of the borehole 8 thereby creating different resistivity levels in and around the borehole 8, viz., a mud cake zone of resistivity Rmc; a flushed zone 7 of resistivity Rxo, and a transition zone 11 of resistivity that may vary between the resistivity of the flushed zone and of the formation 9, viz., between Rxo and Rt and for purposes of discussion is called Rapp. In order to indicate the lateral resistivity changes vis-a-vis the drilling mud 10, the flushed zone 7, and the formation 9, not only must the logged current and potential values as provided by logging array 21 (as a function of depth) be systematically collected and indexed, but the impedance values calculated from these values must also be accurately indexed so that afterward, viz., say after logging has been completed, they can be selectively manipulated to provide different degrees of lateral resolution irrespective of whether or not the response initiators for such manipulations, are artificial sets of current or potential values. In that way, the lateral resistivity changes mentioned above can be easily determined.

During collection of data in accordance with FIG. 1, the logging array 21 moves through the borehole 8 at a constant rate of speed. The current electrodes of assembly $E_1$ and then assembly $E_M$ are sequentially activated in a rapid manner. Measurements occur at instants in time when the electrode assemblies $E_1, E_2 \ldots E_M$ have moved precisely a distance "a", equal to the electrode assembly spacing factor, as previously mentioned, and occur so fast vis-a-vis the speed of the array 21 along the borehole 8, to be termed "instantaneous" with respect to a series of common equi-spaced logging stations $d_1, d_2 \ldots d_v$ along the borehole 8. Potential measurements typically begin with assembly $E_1$ and proceed in ordered sequences through the remaining assemblies $E_2, E_3$, etc. and end with assembly $E_M$, as when the current electrode of assembly $E_1$ is activated. When the current electrode of assembly $E_M$ is energized, the measuring sequence is the same, beginning at assembly $E_1$ and ending at assembly $E_M$. As the logging array 21 is rolled up or down the borehole one logging station say where assembly $E_1$ is rolled down from logging station $d_1$ to station $d_2$, the collection process is repeated. Result: a series of current and potential values are systematically collected as a function of depth for later manipulation as set forth below. But note that current and potential values to be manipulated only have formation integrity if they all relate to the same stationary collection local. That is to say, values must be indexed to a particular stationary depth scan interval (equal to M logging stations as explained below) that prevents intertwining of like values of different depth can intervals, in a manner also explained in more detail below.

FIG. 4 illustrates how systematic collection and indexing occurs during operations. For description purposes, it is assumed that the number of electrode assemblies comprising the logging array 21 has been greatly curtailed, say scaled down from the large array of FIG. 1 to a 5-electrode array comprising electrode assemblies $E_1, E_2 \ldots E_5$, and the array 21 is shown in a limited number of "snapshots" in time during its downward movement along the borehole. That is, only eight (8) collection cycles 1, 2 ... 8 for logging positions A, B, ... H will be described in detail. At each logging position A, B ... or H, currrent is sequentially injected first by means of the current electrode (not shown) of the electrode assembly $E_1$, and then by the current electrode of the assembly $E_5$ in such a rapid manner that for purposes of annotation, the assemblies $E_1$, $E_2$ ... $E_5$ of the array 21 occupy the same logging stations during current injection via the assemblies $E_1$ and $E_5$ and subsequent measurements of potentials at assemblies $E_1$, $E_2$ ... $E_5$. But after a period of initialization, there will be generated sufficient precursor current and potential values to form entries for a $5 \times 5$ matrix gather and it is from that standpoint that the $5 \times 5$ gather matrices of the present invention are presented. In associating the measured potential and current values into $5 \times 5$ matrices, it will become evident that potential quantities (both absolute and differential) at potential electrodes which do not lie below the current electrode will provide matrix entries on and above its diagonal, while those collected below will provide entries below its diagonal. In this regard, the ordinate of the plot in FIG. 4 is units of depth and the abscissa is in units of incremental time or cycles 1, 2 ... 8. Spacing between the assemblies $E_1$ ... $E_5$ is equal to spacing factor "a", as is the distance between adjacent logging stations $d_1$, $d_2$ ... $d_y$. To repeat, although the array 21 is continuously moving along the borehole 8, each logging position A, B, ... H marks a moment in time in which collection of the potential, phase and current values occurs. Note in this regard, that during collection of data in accordance with FIG. 4, the array is continuously rolled downward. Movement of the array 21 occurs because of reeling out of cable 12 via hoisting unit 16. The collected values are transmitted uphole via the cable 12 and thence at the earth's surface 15, from the hoisting unit 16 to the controller-processor circuit 17. Because of the large mass of data indexing of the logged values is rather important and dependent upon the absolute as well as relative depth positions of the emitting current electrode as well as that of the potential measuring electrodes comprising the electrode assemblies $E_1$, $E_2$ ... $E_5$.

For example, for measurements taken when array 21 is at position A in FIG. 4, the current electrode of electrode assembly E1 is at depth marker $d_k$ coincident with logging station (d1), while the current electrode of assembly E5 is at depth marker $d_k + 4a$ coincident with logging station (d5). For the array 21 each measuring cycle 1, 2, ... 5 requires the collection of the following analog values: (1) 8-potential difference values, (2) 10 absolute potential values, one of which is redundant, (3) two current intensity values and (4) two pairs of control values related to indicating phase distortion, i.e., indicating distortion via a time difference between the current or voltage at the current electrode of the assembly E1 or E5 when activated, and that at the most remote potential electrode of the assemblies. These values are transmitted uphole via cable 12 and thence at the earth's surface 15 from hoisting unit 16 to controller-processor circuit 17 for storage, and manipulating in accordance with the method of the present invention.

In order to assure that addresses of the collected current and potential values are complete, the following indices are made of record, vis-a-vis the collected current and potential values, viz.: (i) by depth markers $d_k$, $d_k + a$ ... $d_k + 12a$ where the factor "a" is the incremental spacing between electrode assemblies and $d_k$ is the absolute depth of the electrode $E_1$ at the start of data collection, viz., when the array is positioned at position A associated with collection cycle 1; (ii) by consecutive numbered electrode logging stations ($d_1$, $d_2$, $d_3$ ... $d_{13}$) associated with the entire logging operation as where the relative position of each station is of interest (iii) by scan depth station number ($Sd_1$, $Sd_2$, etc.) associated with the depth of the mid-central electrode assembly corresponding to particular matrix gathers of interest of which seven are shown in FIG. 4, being located at $d_k + 6a$, $d_k + 7a$, ... $d_k + 12a$. These values can be indexed in a number of different formats as the data is collected, typical of which being displays 46, 47, 48, 49, 50, 51, 52, and 53, and then being re-indexed in matrix gather format as set forth in display 54. It should be further noted that the displays 46, 47 ... 53 have a further annotation tag: viz., that the depicted values forming each such display must be further indexed to indicate the depth of the current electrode of electrodre assembly $E_1$ or $E_5$ used as the current emitter during each of the collection cycles 1, 2, 3 ... 8 which give rise to displays 46, 47 ... 53. Such annotation system can also be carried over into re-indexed matrix gather display 54 of the impedance values associated with these measurements, as explained below.

That is to say, assume that absolute depths of the numbered logging stations are known; so that when the array 21 is located at position A then the electrode assemblies $E_1$, $E_2$, $E_5$ ... will be associated with the internal numbering index 1, 2 ... 5 of consecutive order; hence, when the current electrode of electrode assembly $E_1$ is at depth $d_k$ and measurements at the associated electrode assemblies taken, then the absolute and differential potential values and current intensity would be indicated by the following indices during the first half of the collection cycle:

$$V_{1,1}(d_k)$$
$$V_{2,1}(d_k)$$
$$\vdots$$
$$V_{5,1}(d_k)$$
$$\Delta V_{2,1}(d_k)$$
$$\Delta V_{3,1}(d_k)$$
$$\vdots$$
$$\Delta V_{5,1}(d_k)$$
$$J_1(d_k)$$

During the second half of the collection cycle, when the current electrode of assembly $E_5$ is at depth $d_k + 4a$ and measurements at the assemblies taken, then the absolute and differential potential values and current intensity would be indicated as follows:

$$V_{1,5}(d_k + 4a)$$
$$V_{2,5}(d_k + 4a)$$
$$\vdots$$
$$V_{5,5}(d_k + 4a)$$
$$\Delta V_{2,5}(d_k + 4a)$$
$$\Delta V_{3,5}(d_k + 4a)$$
$$\vdots$$
$$\Delta V_{5,5}(d_k + 4a)$$
$$J_5(d_k + 4a)$$

Note with respect to the indices for the absolute potential that the first subscript relates to the internal index number of the 5-electrode array at which the potential measurement occurs and the second subscript identifies the internal index number of the current electrode undergoing energization while the address in parenthesis relates absolute depth from say the earth's surface 15 to the position of the current electrode undergoing activation. In regard to the last-mentioned address tag, the logging station of the current electrode, viz., logging station ($d_5$), could also be used as a substitute since absolute depth can be latter calculated.

Note that the potential differences are measured between the pairs of electrode assemblies, i.e., between electrode assemblies 1 and 2; 2 and 3; 3 and 4; etc., these values are also indexed in a similar manner as above. That is, in accordance with the following:

$$\Delta V_{i,1}(d_k) \text{ where } i=2,\ldots,5$$

$$\Delta V_{i,5}(d_k+4a) \text{ where } i=2,\ldots,5$$

Note that in the above, that the first subscript relates the position of the deeper of each pair of electrode assemblies and assumes that the normalizing value for forming the difference potential value relates to the descending ordered electrode assembly. That is, the values $$\Delta V_{2,1}(d_k) \text{ and } \Delta V_{2,5}(d_k+4a)$$

indicate that the potential difference is measured between the potential electrodes of assemblies $E_1$ and $E_2$ internally numbered as 1 and 2, respectively, and that the current electrode is positioned at internal ordered numbered assemblies 1 and 5, respectively, while the values $$\Delta V_{4,1}(d_k) \text{ and } \Delta V_{4,5}(d_k+4a)$$

indicate that the potential difference is measured between assemblies E3 and E4 internally numbered as assemblies 3 and 4 in FIG. 4, with the current emitter being associated with internal numbered assemblies 1 and 5, respectively. Note that depiction of the aforementioned values as set forth above, comprises entries of columns 46a, and 46b of display 46. The current intensities are shown as the entires of column 46c while the pair of time measurements $T_1(d_k)$, $T_5(d_k)$ and $T_5(d_k+4a)$, $T_1(d_k+4a)$ associated with indicating phase distorton, if any, are set forth as the entires of column 46d.

The next step in the method in accordance with the present invention is to repeat the above-described measurements at the positions B, C, D . . . H in FIG. 4. viz., with the current electrodes of assembly $E_1$ at depth locations $d_k+a$, $d_k+2a$, $d_k+3a$, $d_k+4a$, $d_k+5a$, $d_k+6a$ and $d_k+7a$; and with the current electrode of assembly $E_5$ at depth locations $d_k+5a$, $d_k+6a$, $d_k+7a$, $d_k+8a$, $d_k+9a$, $d_k+10a$, and $d_k+11a$, along with pairs of control values in appropriate time coordinates so as to indicate the presence (or absence) of phase distortion, in a manner as set forth above. These values occupy entries of columns 47a, 47b . . . 47d of display 47; columns 48a, 48b . . . 48d of display 48; columns 49a, 49b . . . 49d of display 49; columns 50a, 50b . . . 50d of display 50, columns 51a, 51b . . . 51d of display 51, columns 52a, 52b . . . 52d of display 52, and columns 53a, 53b . . . 53d of display 53.

Table I, below, sets forth the measurements in tabular form for greater clarity.

TABLE I

| C46a | C46b | C46c | C46d |
|---|---|---|---|
| $V_{1,1}(d_1)$ | $\Delta V_{2,1}(d_1)$ | $J_1(d_1)$ | $T_1(d_1)$ |
| $V_{2,1}(d_1)$ | $\Delta V_{3,1}(d_1)$ | | $T_5(d_1)$ = DISPLAY 46 |
| $V_{3,1}(d_1)$ | $\Delta V_{4,1}(d_1)$ | | |
| $V_{4,1}(d_1)$ | $\Delta V_{5,1}(d_1)$ | | |
| $V_{5,1}(d_1)$ | | | |
| $V_{1,5}(d_5)$ | $\Delta V_{2,5}(d_5)$ | $J_5(d_5)$ | $T_5(d_5)$ |
| $V_{2,5}(d_5)$ | $\Delta V_{3,5}(d_5)$ | | $T_1(d_5)$ |
| $V_{3,5}(d_5)$ | $\Delta V_{4,5}(d_5)$ | | |
| $V_{4,5}(d_5)$ | $\Delta V_{5,5}(d_5)$ | | |
| $V_{5,5}(d_5)$ | | | |
| C47a | C47b | C47c | C47d |
| $V_{1,1}(d_2)$ | $\Delta V_{2,1}(d_2)$ | $J_1(d_2)$ | $T_1(d_2)$ |
| $V_{2,1}(d_2)$ | $\Delta V_{3,1}(d_2)$ | | $T_5(d_2)$ = DISPLAY 47 |
| $V_{3,1}(d_2)$ | $\Delta V_{4,1}(d_2)$ | | |
| $V_{4,1}(d_2)$ | $\Delta V_{5,1}(d_2)$ | | |
| $V_{5,1}(d_2)$ | | | |
| $V_{1,5}(d_6)$ | $\Delta V_{2,5}(d_6)$ | $J_5(d_6)$ | $T_5(d_6)$ |
| $V_{2,5}(d_6)$ | $\Delta V_{3,5}(d_6)$ | | $T_1(d_6)$ |
| $V_{3,5}(d_6)$ | $\Delta V_{4,5}(d_6)$ | | |
| $V_{4,5}(d_6)$ | $\Delta V_{5,5}(d_6)$ | | |
| $V_{5,5}(d_6)$ | | | |
| C48a | C48b | C48c | C48d |
| $V_{1,1}(d_3)$ | $\Delta V_{2,1}(d_3)$ | $J_1(d_3)$ | $T_1(d_3)$ |
| $V_{2,1}(d_3)$ | $\Delta V_{3,1}(d_3)$ | | $T_5(d_3)$ = DISPLAY 48 |
| $V_{3,1}(d_3)$ | $\Delta V_{4,1}(d_3)$ | | |
| $V_{4,1}(d_3)$ | $\Delta V_{5,1}(d_3)$ | | |
| $V_{5,1}(d_3)$ | | | |
| $V_{1,5}(d_7)$ | $\Delta V_{2,5}(d_7)$ | $J_5(d_7)$ | $T_5(d_7)$ |
| $V_{2,5}(d_7)$ | $\Delta V_{3,5}(d_7)$ | | $T_1(d_7)$ |
| $V_{3,5}(d_7)$ | $\Delta V_{4,5}(d_7)$ | | |
| $V_{4,5}(d_7)$ | $\Delta V_{5,5}(d_7)$ | | |
| $V_{5,5}(d_7)$ | | | |
| C49a | C49b | C49c | C49d |
| $V_{1,1}(d_4)$ | $\Delta V_{2,1}(d_4)$ | $J_1(d_4)$ | $T_1(d_4)$ |
| $V_{2,1}(d_4)$ | $\Delta V_{3,1}(d_4)$ | | $T_5(d_4)$ = DISPLAY 49 |
| $V_{3,1}(d_4)$ | $\Delta V_{4,1}(d_4)$ | | |
| $V_{4,1}(d_4)$ | $\Delta V_{5,1}(d_4)$ | | |
| $V_{5,1}(d_4)$ | | | |
| $V_{1,5}(d_8)$ | $\Delta V_{2,5}(d_8)$ | $J_5(d_8)$ | $T_5(d_8)$ |
| $V_{2,5}(d_8)$ | $\Delta V_{3,5}(d_8)$ | $T_1(d_8)$ | |
| $V_{3,5}(d_8)$ | $\Delta V_{4,5}(d_8)$ | | |
| $V_{4,5}(d_8)$ | $\Delta V_{5,5}(d_8)$ | | |
| $V_{5,5}(d_8)$ | | | |
| C50a | C50b | C50c | -C50d |
| $V_{1,1}(d_5)$ | $\Delta V_{2,1}(d_5)$ | $J_1(d_5)$ | $T_1(d_5)$ |
| $V_{2,1}(d_5)$ | $\Delta V_{3,1}(d_5)$ | | $T_5(d_5)$ = DISPLAY 50 |
| $V_{3,1}(d_5)$ | $\Delta V_{4,1}(d_5)$ | | |
| $V_{4,1}(d_5)$ | $\Delta V_{5,1}(d_5)$ | | |
| $V_{5,1}(d_5)$ | | | |
| $V_{1,5}(d_9)$ | $\Delta V_{2,5}(d_9)$ | $J_5(d_9)$ | $T_5(d_9)$ |
| $V_{2,5}(d_9)$ | $\Delta V_{3,5}(d_9)$ | | $T_1(d_9)$ |
| $V_{3,5}(d_9)$ | $\Delta V_{4,5}(d_9)$ | | |
| $V_{4,5}(d_9)$ | $\Delta V_{5,5}(d_9)$ | | |
| $V_{5,5}(d_9)$ | | | |
| C51a | C51b | C51c | C51d |
| $V_{1,1}(d_6)$ | $\Delta V_{2,1}(d_6)$ | $J_1(d_6)$ | $T_1(d_6)$ |
| $V_{2,1}(d_6)$ | $\Delta V_{3,1}(d_6)$ | | $T_5(d_6)$ = DISPLAY 51 |
| $V_{3,1}(d_6)$ | $\Delta V_{4,1}(d_6)$ | | |
| $V_{4,1}(d_6)$ | $\Delta V_{5,1}(d_6)$ | | |
| $V_{5,1}(d_6)$ | | | |
| $V_{1,5}(d_{10})$ | $\Delta V_{2,5}(d_{10})$ | $J_5(d_{10})$ | $T_5(d_{10})$ |
| $V_{2,5}(d_{10})$ | $\Delta V_{3,5}(d_{10})$ | | $T_1(d_{10})$ |
| $V_{3,5}(d_{10})$ | $\Delta V_{4,5}(d_{10})$ | | |
| $V_{4,5}(d_{10})$ | $\Delta V_{4,5}(d_{10})$ | | |
| $V_{5,5}(d_{10})$ | | | |
| C52a | C52b | C52c | C52d |
| $V_{1,1}(d_7)$ | $\Delta V_{2,1}(d_7)$ | $J_1(d_7)$ | $T_1(d_7)$ |
| $V_{2,1}(d_7)$ | $\Delta V_{3,1}(d_7)$ | | $T_5(d_7)$ = DISPLAY 52 |
| $V_{3,1}(d_7)$ | $\Delta V_{4,1}(d_7)$ | | |
| $V_{4,1}(d_7)$ | $\Delta V_{5,1}(d_7)$ | | |
| $V_{5,1}(d_7)$ | | | |
| $V_{1,5}(d_{11})$ | $\Delta V_{2,5}(d_{11})$ | $J_5(d_{11})$ | $T_5(d_{11})$ |
| $V_{2,5}(d_{11})$ | $\Delta V_{3,5}(d_{11})$ | | $T_1(d_{11})$ |
| $V_{3,5}(d_{11})$ | $\Delta V_{4,5}(d_{11})$ | | |
| $V_{4,5}(d_{11})$ | $\Delta V_{5,5}(d_{11})$ | | |

TABLE I-continued $V_{5,5}(d_{11})$

| C53a | C53b | C53c | C53d |
|---|---|---|---|
| $V_{1,1}(d_8)$ | $\Delta V_{2,1}(d_8)$ | $J_1(d_8)$ | $T_1(d_8)$ |
| $V_{2,1}(d_8)$ | $\Delta V_{3,1}(d_8)$ | | $T_5(d_8)$ = DISPLAY 53 |
| $V_{3,1}(d_8)$ | $\Delta V_{4,1}(d_8)$ | | |
| $V_{4,1}(d_8)$ | $\Delta V_{5,1}(d_8)$ | | |
| $V_{5,1}(d_8)$ | | | |
| $V_{1,5}(d_{12})$ | $\Delta V_{2,5}(d_{12})$ | $J_5(d_{12})$ | $T_5(d_{12})$ |
| $V_{2,5}(d_{12})$ | $\Delta V_{3,5}(d_{12})$ | | $T_1(d_{12})$ |
| $V_{3,5}(d_{12})$ | $\Delta V_{4,5}(d_{12})$ | | |
| $V_{4,5}(d_{12})$ | $\Delta V_{5,5}(d_{12})$ | | |
| $V_{5,5}(d_{12})$ | | | |

LEGEND:
$(d_5) = (d_k + 4a); (d_6) = (d_k + 5a); (d_7) = (d_k + 6a);$
$(d_8) = (d_k + 7a);$ and $(d_9) = (d_k + 8a)$
$(d_{10}) = (d_k + 9a); (d_{11}) = d_k + 10a; (d_{12}) = (d_k + 11a)$ From the above-denoted measured values of potential and current intensity, the ratio of the measured values associated with the same set of electrical variables of displays 46, 47, 48 . . . 53 can be determined using the following indices and equations viz., for display 46, $Z_{i,1}(d_k) = V_{i,1}(d_k)/J_1)(d_k), i=1,2,\ldots,5$
$\Delta Z_{i,1}(d_k) = \Delta V_{i,1}(d_k)J_1(d_k), i=2,3,\ldots,5$
$Z_{i,5}(d_k + 4a) = V_{i,5}(d_k + 4a)/J_5 (d_k + 4a), i=1,2,\ldots,5$
$\Delta Z_{i,5}(d_k + 4a) = \Delta V_{i,5}(d_k + 4a))/J_5(d_k + 4a) \ i=2,3,\ldots,5$ For the example set forth in FIG. 4, such entries are set forth in tabular form in Table II.

TABLE II

| | | | | |
|---|---|---|---|---|
| $Z_{1,1}(d_1)$ | $\Delta Z_{2,1}(d_1)$ | $Z_{1,5}(d_5)$ | $\Delta Z_{2,5}(d_5)$ | FROM |
| $Z_{2,1}(d_1)$ | $\Delta Z_{3,1}(d_1)$ | $Z_{2,5}(d_5)$ | $\Delta Z_{3,5}(d_5)$ | DISPLAY 46 |
| $Z_{3,1}(d_1)$ | $\Delta Z_{4,1}(d_1)$ | $Z_{3,5}(d_5)$ | $\Delta Z_{4,5}(d_5)$ | |
| $Z_{4,1}(d_1)$ | $\Delta Z_{5,1}(d_1)$ | $Z_{4,5}(d_5)$ | $\Delta Z_{5,5}(d_5)$ | |
| $Z_{5,1}(d_1)$ | | $Z_{5,5}(d_5)$ | | |
| $Z_{1,1}(d_2)$ | $\Delta Z_{2,1}(d_2)$ | $Z_{1,5}(d_6)$ | $\Delta Z_{2,5}(d_6)$ | FROM |
| $Z_{2,1}(d_2)$ | $\Delta Z_{3,1}(d_2)$ | $Z_{2,5}(d_6)$ | $\Delta Z_{3,5}(d_6)$ | DISPLAY 47 |
| $Z_{3,1}(d_2)$ | $\Delta Z_{4,1}(d_2)$ | $Z_{3,5}(d_6)$ | $\Delta Z_{4,5}(d_6)$ | |
| $Z_{4,1}(d_2)$ | $\Delta Z_{5,1}(d_2)$ | $Z_{4,5}(d_6)$ | $\Delta Z_{5,5}(d_6)$ | |
| $Z_{5,1}(d_2)$ | | $Z_{5,5}(d_6)$ | | |
| $Z_{1,1}(d_3)$ | $\Delta Z_{2,1}(d_3)$ | $Z_{1,5}(d_7)$ | $\Delta Z_{2,5}(d_7)$ | FROM |
| $Z_{2,1}(d_3)$ | $\Delta Z_{3,1}(d_3)$ | $Z_{2,5}(d_7)$ | $\Delta Z_{3,5}(d_7)$ | DISPLAY 48 |
| $Z_{3,1}(d_3)$ | $\Delta Z_{4,1}(d_3)$ | $Z_{3,5}(d_7)$ | $\Delta Z_{4,5}(d_7)$ | |
| $Z_{4,1}(d_3)$ | $\Delta Z_{5,1}(d_3)$ | $Z_{4,5}(d_7)$ | $\Delta Z_{5,5}(d_7)$ | |
| $Z_{5,1}(d_3)$ | | | $\Delta Z_{5,5}(d_7)$ | |
| $Z_{1,1}(d_4)$ | $\Delta Z_{2,1}(d_4)$ | $Z_{1,5}(d_8)$ | $\Delta Z_{2,5}(d_8)$ | FROM |
| $Z_{2,1}(d_4)$ | $\Delta Z_{3,1}(d_4)$ | $Z_{2,5}(d_8)$ | $\Delta Z_{3,5}(d_8)$ | DISPLAY 49 |
| $Z_{3,1}(d_4)$ | $\Delta Z_{4,1}(d_4)$ | $Z_{3,5}(d_8)$ | $\Delta Z_{4,5}(d_8)$ | |
| $Z_{4,1}(d_4)$ | $\Delta Z_{5,1}(d_4)$ | $Z_{4,5}(d_8)$ | $\Delta Z_{5,5}(d_8)$ | |
| $Z_{5,1}(d_4)$ | | $Z_{5,5}(d_8)$ | | |
| $Z_{1,1}(d_5)$ | $\Delta Z_{2,1}(d_5)$ | $Z_{1,5}(d_9)$ | $\Delta Z_{2,5}(d_9)$ | FROM |
| $Z_{2,1}(d_5)$ | $\Delta Z_{3,1}(d_5)$ | $Z_{2,5}(d_9)$ | $\Delta Z_{3,5}(d_9)$ | DISPLAY 50 |
| $Z_{3,1}(d_5)$ | $\Delta Z_{4,1}(d_5)$ | $Z_{3,5}(d_9)$ | $\Delta Z_{4,5}(d_9)$ | |
| $Z_{4,1}(d_5)$ | $\Delta Z_{5,1}(d_5)$ | $Z_{4,5}(d_9)$ | $\Delta Z_{5,5}(d_9)$ | |
| $Z_{5,1}(d_5)$ | | $Z_{5,5}(d_9)$ | | |
| $Z_{1,1}(d_6)$ | $\Delta Z_{2,1}(d_6)$ | $Z_{1,5}(d_{10})$ | $\Delta Z_{2,5}(d_{10})$ | FROM |
| $Z_{2,1}(d_6)$ | $\Delta Z_{3,1}(d_6)$ | $Z_{2,5}(d_{10})$ | $\Delta Z_{3,5}(d_{10})$ | DISPLAY 51 |
| $Z_{3,1}(d_6)$ | $\Delta Z_{4,1}(d_6)$ | $Z_{3,5}(d_{10})$ | $\Delta Z_{4,5}(d_{10})$ | |
| $Z_{4,1}(d_6)$ | $\Delta Z_{5,1}(d_6)$ | $Z_{4,5}(d_{10})$ | $\Delta Z_{5,5}(d_{10})$ | |
| $Z_{5,1}(d_6)$ | | $Z_{5,5}(d_{10})$ | | |
| $Z_{1,1}(d_7)$ | $\Delta Z_{2,1}(d_7)$ | $Z_{1,5}(d_{11})$ | $\Delta Z_{2,5}(d_{11})$ | FROM |
| $Z_{2,1}(d_7)$ | $\Delta Z_{3,1}(d_7)$ | $Z_{2,5}(d_{11})$ | $\Delta Z_{3,5}(d_{11})$ | DISPLAY 52 |
| $Z_{3,1}(d_7)$ | $\Delta Z_{4,1}(d_7)$ | $Z_{3,5}(d_{11})$ | $\Delta Z_{4,5}(d_{11})$ | |
| $Z_{4,1}(d_7)$ | $\Delta Z_{5,1}(d_7)$ | $Z_{4,5}(d_{11})$ | $\Delta Z_{5,5}(d_{11})$ | |
| $Z_{5,1}(d_7)$ | | $Z_{5,5}(d_{11})$ | | |
| $Z_{1,1}(d_8)$ | $\Delta Z_{2,1}(d_8)$ | $Z_{1,5}(d_{12})$ | $\Delta Z_{2,5}(d_{12})$ | FROM |
| $Z_{2,1}(d_8)$ | $\Delta Z_{3,1}(d_8)$ | $Z_{2,5}(d_{12})$ | $\Delta Z_{3,5}(d_{12})$ | DISPLAY 53 |
| $Z_{3,1}(d_8)$ | $\Delta Z_{4,1}(d_8)$ | $Z_{3,5}(d_{12})$ | $\Delta Z_{4,5}(d_{12})$ | |
| $Z_{4,1}(d_8)$ | $\Delta Z_{5,1}(d_8)$ | $Z_{4,5}(d_{12})$ | $\Delta Z_{5,5}(d_{12})$ | |

TABLE II-continued $Z_{5,1}(d_8)$ $\qquad$ $Z_{5,5}(d_{12})$

LEGEND:
$(d_1)=d_k; \ (d_2)=d_k+a; \ (d_3)=d_k+2a; \ (d_4)=d_k+3a; \ (d_5)=d_k+4a; \ (d_6)=d_k+5a; \ (d_7)=d_k+6a; \ (d_8)=d_k+7a; \ (d_9)=d_k+8a; \ (d_{10})=d_k+9a; \ (d_{11})=d_k+10a; \ (d_{12})=d_k+11a$

Thus in general, for the fixed matrix having M×M entries, (the largest unrevised numbered asembly of the array being M where in the above example, M=5), to gather data about depth marker $d_k 3Na$, then the data for this gather will be a subset of the following quantities:

(With electrode assembly $E_M$ activated and assembly $E_1$ inactive)

| | |
|---|---|
| $V_{i,M}(d_k+(M-2+r)a),$ | $i=1,2,\ldots,M$ |
| | $r=1,2,\ldots 2M-2$ |
| $\Delta V_{i,M}(d_k+(M-2+r)a),$ | $i=2,3,\ldots,M$ |
| | $r=1,2,\ldots,2M-2$ |
| $J_M(d_k+(M-2+r)a),$ | $r=1,2,\ldots,2M-2$ |

(With assembly $E_1$ energized and assembly $E_M$ inactive)

$V_{i,1}(d_k + (r - 1)a), i = 1,2,\ldots,M$
$\qquad r = 1,2,\ldots,2M - 2$ $\Delta V_{i,1}(d_k + (r - 1)a), i = 2,3,\ldots,M$
$\qquad r = 1,2,\ldots,2M - 2$ $J_1(d_k + (r - 1)a), r = 1,2,\ldots,2M - 2$ In the above quantities, the index "r" represents a display index identifying particular records involved with generation of the gather for each pair of current activations per display. For example for the displays 46, 47 . . . 53 to form matrix gather 54 of FIG. 4, it is seen that until there are 8 displays, there are insufficient data to generate a gather about depth $d_k+6a$.

Thereafter, the above results can be re-indexed in matrix gather format to generate the display 54 as previously mentioned. Note in this regard that the matrix entries set forth in the display 54 preserve the one-to-one relationship of the current and potential values collected with the logging array 21 at the different logging positions in FIG. 4. These entires are set forth in tabular form in Table III and have been annotated for discussion purposes in Table II. In comparing the entries of Tables II and III, note that the scan depth (Sd1) of the depicted matrix gather is coincident with depth marker $(d_k+6a)$ that is four depth markers below where the mid-central assembly was initially positioned as collection occurred (i.e., at cycle 1), while the next in time scan depth station (Sd2) is at a depth of $d_k+7a$ which is one logging station below Sd1.

TABLE III

| C1 | C2 | C3 | C4 | C5 | |
|---|---|---|---|---|---|
| $Z_{1,1}(d_5)$ | $Z_{2,1}(d_5)$ | $Z_{3,1}(d_5)$ | $Z_{4,1}(d_5)$ | $Z_{5,1}(d_5)$ | R1 |
| $\Delta Z_{2,1}(d_5)$ | $\Delta Z_{5,5}(d_6)$ | $\Delta Z_{4,5}(d_7)$ | $\Delta Z_{3,5}(d_8)$ | $\Delta Z_{2,5}(d_9)$ | R2 |
| $\Delta Z(Sd_1)=$ $\Delta Z_{3,1}(d_5)$ | $\Delta Z_{2,1}(d_6)$ | $\Delta Z_{5,5}(d_7)$ | $\Delta Z_{4,5}(d_8)$ | $\Delta Z_{3,5}(d_9)$ | R3 |
| $\Delta Z_{4,1}(d_5)$ | $\Delta Z_{3,1}(d_6)$ | $\Delta Z_{2,1}(d_7)$ | $\Delta Z_{5,5}(d_8)$ | $\Delta Z_{4,5}(d_9)$ | R4 |
| $\Delta Z_{5,1}(d_5)$ | $\Delta Z_{4,1}(d_6)$ | $\Delta Z_{3,1}(d_7)$ | $\Delta Z_{2,1}(d_8)$ | $\Delta Z_{5,5}(d_9)$ | R5 |

LEGEND:
$d_5 = d_k + 4a; \ d_6 = d_k + 5a; \ d_7 = d_k + 6a;$
$d_8 = d_k + 7a; \ d_9 = d_k + 8a; \ Sd_1 = d_7 = d_k + 6a.$

The matrix of Table III has its columns indexed C1, . . . , C5 (increasing from left to right) and its rows indexed R1, ... R5 (increasing from top to bottom) which is the normal matrix indexing sequence notation. Following this convention for the general case where the dimensions of the matrix are M×M (instead 5×5), and designating the elements of the modified matrix $\Delta Z(Sd_1)$ by the quantities $(\Delta Z(d_k+3Na))_{i,j}$, the elements are given by the following formulas (where $d_k+3Na=Sd_1$):

(the first row elements)

$$(\Delta Z(d_k+3Na))_{1,j} = Z_{j,1}(d_k+2Na), j=1, \ldots, M;$$

(the diagonal and supradiagonal elements)

$$(\Delta \underline{Z}(d_k + 3Na))_{i,j} =$$

$$\Delta Z_{M+i-j,M}(d_k + (2N+j-1)a), \begin{array}{l} i = 2, \ldots, M \\ j = i, \ldots, M \end{array}$$

(the subdiagonal elements)

$$(\Delta \underline{Z}(d_k + 3Na))_{i,j} =$$

$$\Delta Z_{1+i-j,1}(d_k + (2N+j-1)a), \begin{array}{l} i = 2, \ldots, M \\ j = 1, \ldots, i-1 \end{array}$$

It should be noted in the above formulas that the elements on and above the diagonal (i.e., the diagonal and supradiagonal elements) with the exception of the first row, require entries from Table II for those situations for which the $E_M$ electrode delivers current for the array over a depth interval of $d_k+(2N+1)a$ to $d_k+4Na$. Note that the first row elements are obtained by means of reciprocity.

Finally for the subdiagonal elements of the matrix (those entries below the diagonal) it allows from the above discussion that the $E_1$ electrode assembly must deliver the current for the array during collection over the depth interval $d_k+2Na$ to $d_k+(4N-1)$ a.

Thus, the collected entries comprising the display 54 have the following common characteristics: (i) they are related to measured precursor values within the formation adjacent to the borehole: (ii) they are indexed to a particular zone within the earth which is defined by the extreme values of the depth arguments of the matrix entries, i.e., for example, by the depth arguments of the first and last entries of the last row (iii) they are also indexed to a particular scanning depth station number associated with the depth of the mid-central electrode position.

It should be recalled that each of the entries forming the matrix gather of Table III represents the ratio of selected measured potential and current values systematically generated by the array 21 at logging positions A ... H in FIG. 4. Indexing is as follows: the display 54 comprises a 5×5 matrix of impedance values. Rows of the matrix are denoted by R1, R2 ... R5, while columns are specified by C1, C2 ... C5. Increasing order of the matrix entries for the most part, is from left-to-right. That is to say, for all entries associated with potential difference values, the columns C1, C2 ... C5 increase from left- to right as a function of ordered increases in depth of the current electrode. Each of the columns C1, C2 ... C5 also has a common current electrode numerical identifier and a common depth identifier associated with the index number of the common current electrode of each column.

Within each of the rows R2, R3, ... R5, it is seen that the depth arguments of the entires increase in depth from left-to-right as viewed, viz., increasing from the smallest depth value for the entry at the left of the rows at viewed ending with the largest depth value at the right of the Table.

Note also that subdiagonal entries of Table III parallel to the main diagonal, have common current and potential indexing numbers but ordered increases in depth. The same can be said for supradiagonal entries if one discounts the subscripts of the absolute impedance entries comprising row R1. As a result of indexing the measured impedance values as set forth in the Table III, the interpreter can easily synthesize operations of different types of logging arrays so as to provide a multiplicity of different current penetration patterns and hence more easily determine the resistivity changes as a function of lateral distance into the formation under survey.

It should be further noted that while the display 54 only represents a 5×5 matrix, in actual operations there are many more elements per matrix gather. For example, if the last numbered, unrevised electrode assembly of the logging array is designated by the number "M" (where M=5 in the above example) then there are M×M entries per matrix gather. However, note that one row, usually the R1 row, will be populated by absolute impedance values and the remaining rows, viz., R2, R3 ... RM will be composed of modified impedance entries calculated by dividing measured potential difference values determined from adjacent pairs of potential electrodes of the logging array, by the energizing current. Because of the existence and operability of the principle of linear superposition, the matrix set forth in Table III has the attribute of being able to systematically relate any arbitrary set of emitting currents of the logging array to a corresponding differential potential distribution on any selected number of potential electrodes of the array (or vice versa) in accordance with $$\Delta \underline{V}(d_k+3Na) = \Delta \underline{Z}(d_k+3Na) * \underline{J}(d_k+3Na)$$

where (−) indicates a matrix or vector quantity; the depth $d_k+3Na$ corresponds to that of the scan depth associated with a particular matrix; and where $\Delta V$ and $J$ are M×1 column vectors given by:

$$\Delta \underline{V}(d_k + 3Na) = \begin{pmatrix} V_1(d_k + 2Na) \\ \Delta V_2(d_k + (2N+1)a) \\ \cdot \\ \cdot \\ \Delta V_M(d_k + 4Na) \end{pmatrix}$$

and $$\underline{J}(d_k + 3Na) = \begin{pmatrix} J_1(d_k + 2Na) \\ J_2(d_k + (2N+1)a) \\ \cdot \\ \cdot \\ J_M(d_k + 4Na) \end{pmatrix}$$

Furthermore, $\Delta Z(d_k+3Na)$ is an M×M modified formation impedance matrix akin to that in display 54 when referenced to scan depth $d_k+3Na$.

UPHOLE and DOWNHOLE HARDWARE

In order to provide accurate control to the logging array, the present invention of FIG. 1 contemplates using surface control circuitry to monitor downhole operations, that is, to use a controller within processor-controller circuit 17 of van 18 at the earth's surface 15 to clock operations of a slave controller within midsection 30 within the logging array 21 of FIG. 1.

Figure 5:
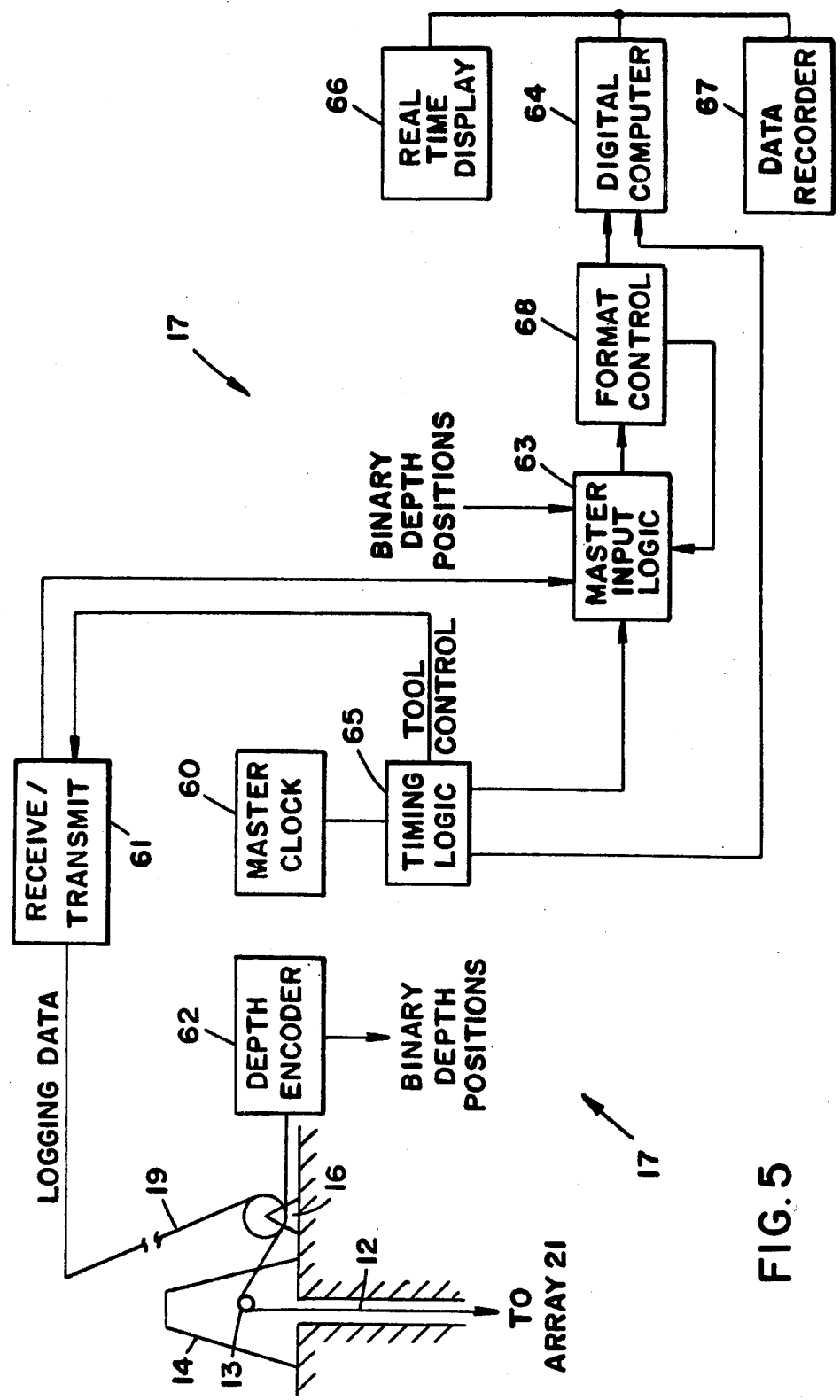
FIGS. 5 and 6 are schematic representations of uphole and downhole circuit elements for carrying out the method of the present invention.
Figure 6:
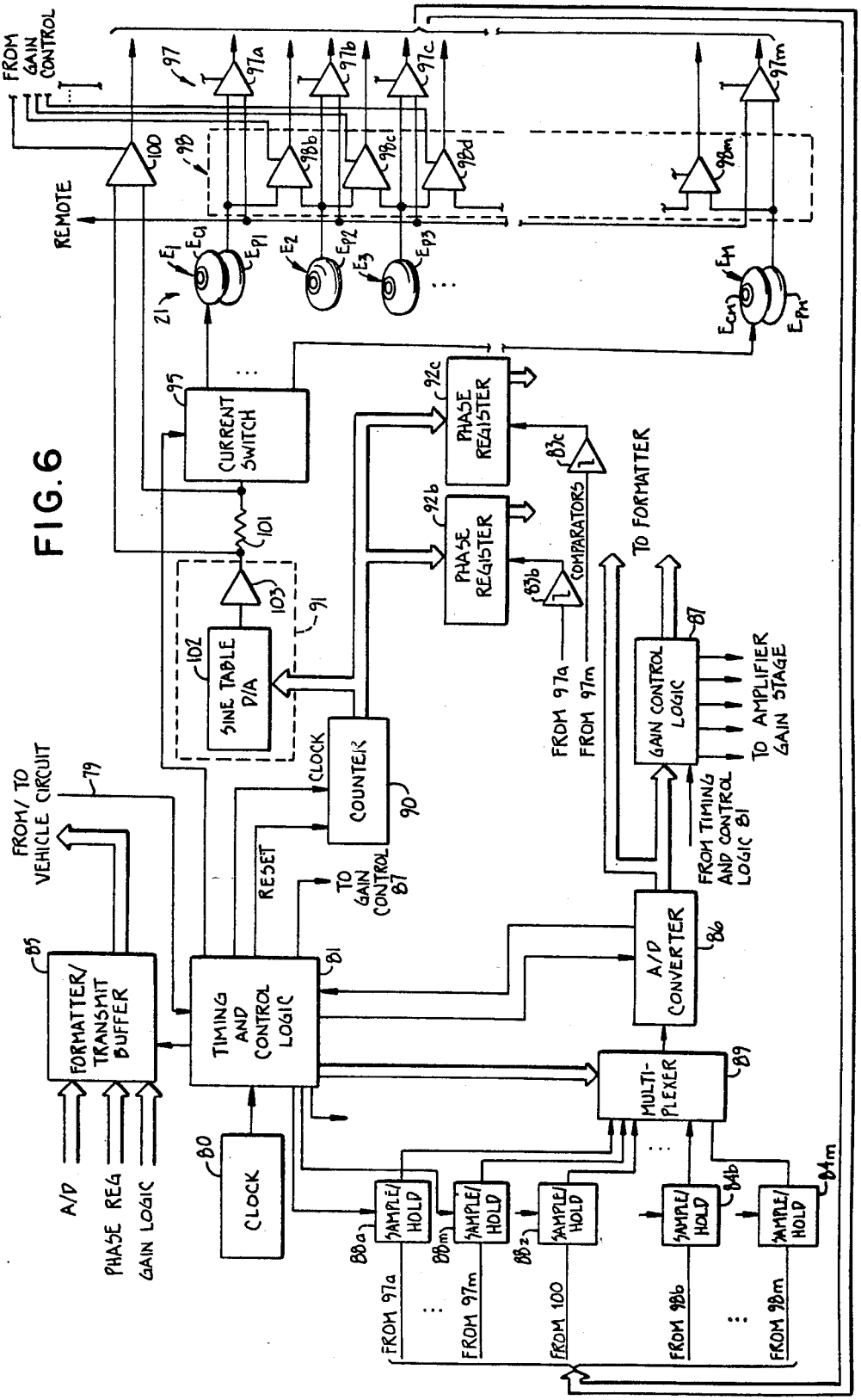

FIGS. 5 and 6 illustrate such operations in detail wherein uphole circuitry is set forth in FIG. 5 and downhole circuitry in FIG. 6.

As shown in FIG. 5, circuit 17 includes a master clock 60 for controlling receive/transmit circuit 61, master input logic circuit 63, and I/O circuit of digital computer 64 through timing logic circuit 65. Logging data of a format and character to be described hereinafter, passes upward from logging array 21 through cable 12, over pulley 13 of derrick 14. Next, the data is transmitted through hoisting unit 16 via conductor 19 to the receive/transmit circuit 61 and thence through the master input logic circuit 63 to the digital computer 64. At the computer 64, the data can be displayed in real time at display unit 66 (say, to check for phase distortion) and then after impedance calculations have been completed, the final matrix is recorded at recorder 67. Since the logging data is initially in a format that is incompatible with computer operation, it must first be demultiplexed at master input logic circuit 63 (i.e., changed from serial to parallel format) and then indexed with appropriate depth markers from depth encoder 62 attached to hoisting unit 16. To provide proper word and block lengths to the data compatible with processing within computer 64, the master logic circuit 63 is carefully controlled using timing logic circuit 65 in conjunction with master clock 60.

As to depth encoder 62, note that in operations such depth encoder not only provides the absolute depth of a reference location of the array 21 relative to the earth's surface 15 (preferably based on the depth of the shallowest electrode assembly of the logging array at each logging position). The depth associated with measurements originating at the remaining electrode assemblies of the array 21 of FIG. 1 is determined from the known spacing "a" between adjacent electrode assemblies $E_1, \ldots, E_M$.

In operation, the master clock 60 produces a series of timing (clock) pulses which are applied to logic circuit 65 and thence to the remaining circuits to dictate when such circuits are to perform. Each operation usually requires a certain number of clock pulses, and consequently, the timing to complete one of the various operations is an exact multiple of the clock pulses. For example, the readout of master input logic circuit 63 is achieved during a specific interval of time that is an exact multiple of the clock pulses from master clock 60. As one subset of circuits is disabled, a new subset is enabled by the time pulses so as perform new operations. In this regard note that format control unit 68 is capable of manual changes during data transfer to computer 64. In that way that format of the data can be varied to meet different interpretational requirements occurring at the real time display unit 66 and at the data recorder 67 in the manner previously discussed.

As previously mentioned, FIG. 6 illustrates downhole circuitry in detail.

As shown, a clock 80, in conjunction with timing and control logic circuit 81, is used to control operations of electrode assemblies $E_1, E_2 \ldots E_M$ of the logging array, generally indicated at 21 in the FIG., in conjunction with and in response to the uphole timing circuitry of processor-controller circuit 17. In more detail, assume that clock 80 is free running, and an initialization signal 79 from the uphole circuitry 17 appears at timing and control logic circuit 81 and starts operations. Also assume that by means of the start signal 79 that initialization within the remaining circuit elements of the downhole circuitry has occurred. That is, using an initializing signal from timing and control logic circuit 81, the following elements (formatter/transmit buffer 85; A/D converter 86; gain control logic 87; and multiplexer 89) are correctly initialized to begin operation.

Simultaneously, counter 90, associated with current generator 91, is initialized and operations begin to allow current injection via current switch 95 to shallow and deep electrode assemblies $E_1$ and $E_M$, in sequence.

That is to say, after current generator 91 is activated to inject current into the adjacent formation via current electrode $Ec_1$ and $Ec_M$, current intensity, as well as particular absolute and difference potentials at the potential electrode assemblies $E_1, \ldots, E_M$ are measured and passed to the data acquisition circuits. More specifically, the absolute potentials and the difference potentials are all passed to multiplexer 89, A/D converter 86 and formatter/transmit buffer 85 via sample/hold circuits 88a, 88b, ..., 88m and 84b, 84c, ..., 84m using particular binary gain amplifiers of a series of such amplifiers generally indicated at 97 and 98. Note that comparators 83b and 83c are permanently connected to the outputs of amplifiers 97a and 97m, respectively. In this way phase measurements between the energizing current electrode and the far assembly potential electrode can be obtained.

In this regard, it should be recalled that the gain associated with these downhole measurements is used to increase accuracy, i.e., to correctly indicate the magnitude of the detected measurements being amplified by particular amplifiers 97 and 98. But to avoid overloading the individual amplifiers 97 and 98, gain must be varied in accordance with the signal to be amplified. The gain of each amplifier is controlled by the gain control logic 87 on the basis of the magnitude of the signal during the previous measurement cycle. The gain information from each amplifier is passed to formatter/transmit buffer 85 together with the output from the A/D converter 86 and Becomes a part of the final data word.

CURRENT INTENSITY

In FIG. 6, current intensity is seen to be measured via binary gain amplifier 100 whose gain is also controlled by gain control logic 87, and whose output is fed to multiplexer 89 via sample/hold circuit 88z. For a useful current range of 500 microamperes to 10 amperes, the resistor 101 in the current path should not exceed 0.1 ohm, resulting in a voltage input to the amplifier 100 in a range from 50 microvolts to 1 volt. Hence, its programmable gain is in binary steps ranging from 5 to 100,000, and requires the measured value to be augmented by at least a 15-bit gain code.

PHASE MEASUREMENTS

In order to obtain the phase of the potentials at certain electrode assemblies, the interval times between zero crossings of the signal versus the phase reference, i.e., the start of the current sine wave, are measured. The content of counter 90 serves as the phase reference and is loaded into phase registers 92b and 92c at the precise instant the comparators 83b and 83c detect a zero crossing of the corresponding potential signals. In the present embodiment only the phase of the far electrode assembly and the assembly at which the current is being injected is desired. Any change in the counts indicated in a given phase register is directly proportional to phase distortion providing a direct indication of reliability of the associated measurements.

ABSOLUTE AND DIFFERENTIAL POTENTIAL MEASUREMENTS

In order to provide a current intensity at electrode $E_{c1}$ of the electrode assembly $E_1$, the following must occur in sequence: first, counter 90 is reset via a reset signal from timing and control logic 81. Clock pulses at the input of counter 90 increments its content until a complete current cycle is generated. The sin lookup table D/A converter 102 then converts the content of counter 90 to produce a series of discrete current values whose individual amplitudes vary sinusoidally with time. After amplification via amplifier 103 the sinusoidally varying current is gated through current switch 95 to the current electrode $E_{c1}$ of the electrode assembly $E_1$ and thence into the adjacent formation in the manner previously described. In this regard, it is assumed that the electrode assemblies that make up the generic logging array now being described, have essentially infinite internal impedances so that they do not draw appreciable current from the surrounding medium and they are physically small ringlets as previously described so that their presence does not tend to alter significantly the potential field in the vicinity of the outer surface of the array. Additionally, the current from the current electrode of course must return to close the measuring circuit and this is done by means of remotely located return electrode 28 of FIG. 1. The return electrode 28, for all practical purposes appears to be located at infinity.

Then, measurements are made of the absolute potentials at all assemblies (with respect to the reference electrode 29 of FIG. 1) along with all differential potentials at all adjacent pairs of potential electrodes $Ep_1$, $Ep_2$ ... $Ep_M$ of the electrode assemblies $E_1$, $E_2$ ... $E_M$ comprising the array 21. That is to say, the absolute potentials at potential electrodes $Ep_1$, $Ep_2$, ..., $Ep_M$ are indicated via amplifiers 97a, 97b, ..., 97m, while potential differences of adjacent pairs of potential electrodes $Ep_1$, $Ep_2$, ..., $Ep_M$ are measured by means of differential binary gain amplifiers 98b, 98c, ..., 98m.

Thereafter, the collection process is repeated using gating circuit 95 to activate the next electrode assembly with current, viz., the current electrode $E_{cM}$ of assembly $E_M$. Absolute potential is measured at all electrodes $Ep_1$, $Ep_2$, ..., $Ep_M$ by means of amplifiers 97a, 97b, ..., 97m, while potential differences of the adjacent pairs of electrodes $Ep_1$, $Ep_2$, ..., $Ep_M$ are measured by means of amplifiers 98b, 98c, ..., 98m in similar fashion as discussed above. The entire collection process is repeated after the array has moved one logging station either up or down.

Figure 7:
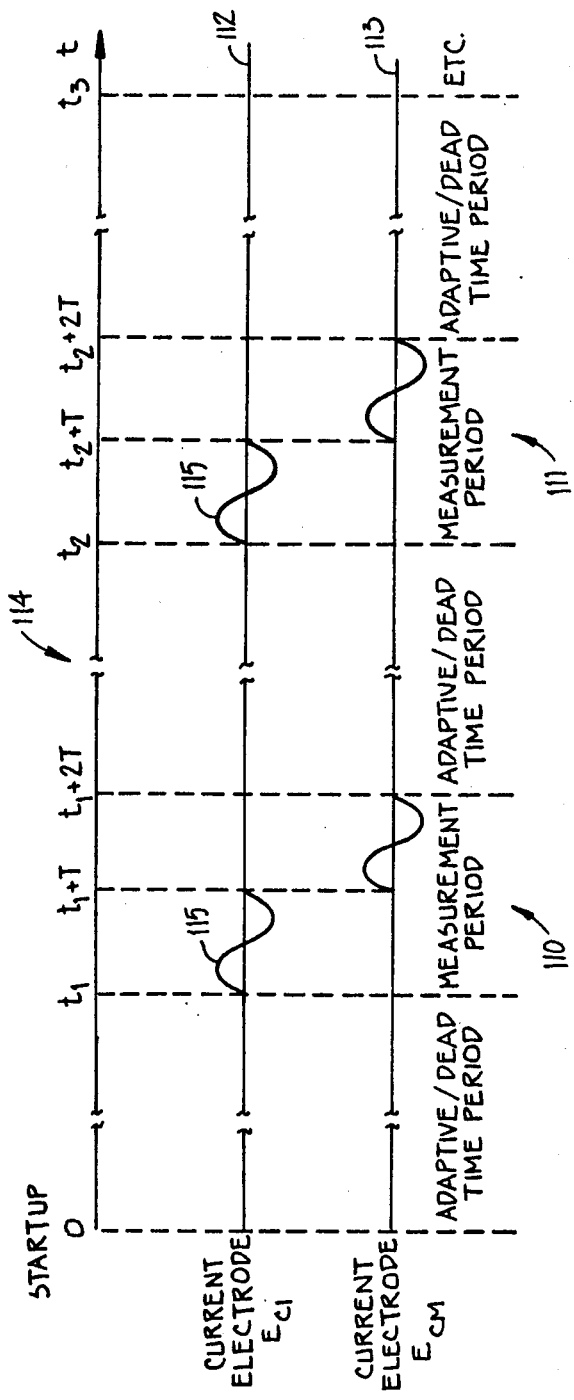
FIG. 7 is a plot of the waveforms at the current electrodes of assemblies $E_1$ and $E_M$ of the array of FIG. 1.

FIG. 7 is a plot of current amplitude versus time at current electrodes $Ec_1$ and $Ec_M$ of the electrode assemblies $E_1$ and $E_M$, respectively.

As shown, typical measurement periods 110 and 111 illustrate amplitude versus time excusions of the currents emitted by the current electrodes relative to time axes 112 and 113. The measurement periods 110 and 111 are seen to be separated timewise by an inactive period of much longer duration. More specifically, note that each measurement period is separated in time from the adjacent measurement period by a duration such that the array will have traveled an incremental vertical distance equal to the spacing factor "a" between electrode assemblies of the array. Also note that the inactive period 114 begins at a time that is incrementally equal to 2T after the beginning of the measurement period 110.

The speed of a continuously moving array can be written as follows:

$$V = fa/2T$$

where f is the fractional travel parameter with "a" and T being defined as above. The parameter f is the estimated fraction of the spacing "a" the array is allowed to move during a measurement cycle without introducing significant error in the vertical electrode positions. Typically, one might require f=0.05 or less, for example, which for a =5 inches fixes the relationship between the electrical frequency of the current (frequency=1-/period=1/T) and the speed of the continuously moving array. As is well known in the art of electrical logging, electrical frequency should be at most a few tens of Hertz for an array with dimensions typical of the present invention, say of the order of 30 Hertz or less, thereby allowing a logging speed of approximately 1125 feet/hour.

It should be noted that while the inactive periods, of which 114 of FIG. 7 is typical, can be used for such tasks as data transmission, adaptive amplifier gain changes, etc., it is also possible to continue to acquire additional data in the manner outlined above by continuing to sequentially activate the current electrodes of assemblies $E_1$ and $E_M$. Such data can be employed in various signal enhancement schemes to get improved impedance estimates in the face of environmental noise.

It should be noted that as the collection cycle is repeated, at the earth's surface 15, the measurements are annotated and then processed to provide impedance entries of a series of finite, overlapping matrix gathers associated with a series of depth intervals. That is to say, each gather of impedance entries is indexed to a selected mid-central depth interval dependent on the active length of the electrode array (between electrodes $E_1$ and $E_M$) that defines the shallow and deep depth limits of each such gather.

It remains now to indicate briefly how the data may be measured and then transmitted uphole based on data records divided into words and blocks compatible with the computer 64. A brief description of the collection and transmission format is in order and is set forth below.

COLLECTION, TRANSMISSION AND TAPE FORMAT

A data record consists of depth information provided by the depth encoder 62 of FIG. 5 followed by data collected by the array 21 of FIG. 1 as outlined previously.

More specifically, with the tool at a preselected depth, depth information is input to digital computer 64 via master input logic 63, and a start signal to the tool is transmitted via receive/transmit circuit 61. As previously described, this start signal initiates the data collection process whereby (i) absolute potential data, (ii) differential potential data, (iii) current intensity data and (iv) phase data are transmitted sequentially via formatter/transmit buffer 85 in a predetermined sequence to controller-processor circuit 17, as indicated in FIG. 6.

Each data word consists of the 16-bit output from the A/D converter plus a maximum of 16 bits for the corresponding gain code. Measurements at the electrodes are gain-indexed. Gains must be set in binary steps from 10 to 3500 for absolute potential measurements (requiring a 9-bit gain code); from 10 to 200,000 for potential difference measurements (requiring a 15-bit gain code); and from 5 to 100,000 for current measurements (requiring a 15-bit gain code). The phase measurement does not require a gain code.

The amount of data contained in a data record as outlined above is determined by the number of active electrode assemblies on the tool. For example, assuming that 73 active electrode assemblies are utilized, then each time a current electrode is activated, this will result in 73 absolute potentials, 72 differential potentials, 1 current intensity and 2 phase measurements, and correspondingly, 146 gain codes. Since two current electrode activations occur sequentially (i.e., at electrons $Ec_1$ and $Ec_M$) at each depth station, this results in $$2*(148+146)*(16)=9408 \text{ bits}$$

of information per data record.

The present invention does of course not preclude the possibility of collecting the above-mentioned data record repeatedly as the tool moves between depth stations in order to allow the use of signal enhancement processing methods to reduce the effects of environmental noise on the quality of the impedance elements.

Simultaneously with the real-time processing of the acquired data it is possible to transfer the information to a storage device such as magnetic tape for later access in processing. The particular format that one chooses for this purpose is somewhat arbitrary but should possibly be dictated by convenience with respect to characteristics of the recording device and the nature of the subsequent processing.

For comprehensive identification purposes, data records are preceded by header information which, in addition to the usual information describing time, site, etc., should also contain data describing such parameters as electrode spacing "a", mandrel diameter, number of active electrodes used in collecting the data, potential reference electrode location, etc.

For purposes of clarity the following points are reiterated:

(1) Since the electrode assemblies $E_1$ and $E_M$ are bifurcated forming first and second ringlets, they essentially occupy the same depth coordinate. That is to say, the axial distance between the ringlets and the axial dimensions of the ringlets are so small compared to the distance between adjacent electrode assemblies that for purposes of discussion they occupy the same general depth location, as previously defined.

(2) In order to manipulate the quantities as functions of several different variables in a rapid manner, the electrode assemblies $E_1, E_2 \ldots E_M$ are numbered using the indexing scheme previously defined, beginning at the top of the mandrel and ending at the deepest point of the mandrel in the borehole. The mid-central electrode assembly is numbered $N+1$ and deepest positioned electrode assembly is numbered $2N+1=M$. Accordingly, once M is established, the numbering of the electrode assemblies is straightforward. That is assume that $M=73$; hence $N+1$ is 37 and the electrode assemblies above the mid-central assembly would be $E_1, E_2, \ldots E_{36}$ and those below would be $E_{37}, E_{38} \ldots E_{73}$.

(3) The measured potential quantities are also indexed, along the lines previously described. That is to say, with the electrode current being emitted by a particular assembly at $d_k$, the absolute and differential potentials of assemblies $E_1, E_2, \ldots, E_M$ are indexed based on the internal numbering order of the active assemblies as previously described, with $d_k$ appearing as argument to denote the station depth occupied by the current emitting electrode.

By continuing to displace the array upward or downward along the borehole as the array is caused to repeat the collection process at each logging station, it is seen that a series of impedance measurements can be developed, indexed to current electrode position and potential electrode position. Next, these values can be reindexed to form a matrix gather of impedance entries associated with formation adjacent to the borehole penetrating the formation under study normalized to depth of the zone of traverse of the matrix; to the scan station number; as well as to the depth of the mid-central electrode assembly position.

It should be noted that because of the principle of linear superposition the impedance matrix gathers provided by the method of the present invention have the attribute of being able to relate an arbitrary set of currents issuing from the M electrodes to the corresponding absolute potential and differential potential distribution appearing on the M electrodes, with respect to the remote reference electrode as previously mentioned.

As a final matter, note the impedance gathers of the present invention can systematically comprise an extremely large number of entries, viz., if the last electrode is designated "M", then there are $M \times M$ entries. However only one row consists of impedance values derived from absolute potential measurements at the electrode assemblies of the array. Accordingly the greater number of entries consists of impedance values calculated from potential differences between adjacent pairs of electrode assemblies, viz., equal to $M-1$ rows of entries. These entries define a modified formation impedance matrix indexed as previously described.

END USE OF THE DATA

In order to accurately determine resistivity of the formation as a function of lateral distance from the borehole, assume that the improved impedance entries of each matrix gather have been determined in accordance with the steps set forth above. Also assume that the reciprocal matrix comprising each gather has been generated. Then based upon the superposition principle, any arbitrary set of voltage differences between adjacent electrode assemblies to a corresponding current response can be related by such determined reciprocal impedance matrix. That is, for a series of drive voltage differences between a selected number of electrode assemblies simulating different focused tool arrays, corresponding current responses can be expressed as a system of linear equations wherein terms thereof include column vectors $\overline{\Delta V}, \overline{J}$ and the reciprocal $\overline{\Delta Z}^{-1}$ matrix, viz.:

$$\overline{J} = \overline{\Delta Z}^{-1} \overline{\Delta V}$$

where $(-)$ indicates a matrix or vector quantity,
$\Delta V^T = [V_1(V_2-V_1)(V_3-V_2) \ldots (V_M-V_{M-1})]$, and
$J^T = [J_1, J_2, J_3 \ldots J_M]$ wherein $\Delta V^T$ and $J^T$ are the transposes of vectors $\Delta V$ and $J$, respectively.

While the prior art has suggested (i) how to use the reciprocals of the above-relationship, viz., how to relate a series of synthetic voltages calculated by productizing a set of current vectors with the resistance matrix of the formation under study (see Stelzer, op. cit.) and (ii) how to construct an equivalent network simulating an earth formation involving the reciprocal resistance matrix to aid in calibrating electric tools (See *THE LOG ANALYST*, May–June 1979, "A Theory of Equivalent Artifical Networks Simulating The Subsurface Formations, and Their Application In Electric Well Logging", Zoltan Barlai), none, as far as we are aware, has contemplated a method for systematically relating a determinable formation characteristic other than synthetic voltage patterns, in general or in particular, for use in determining a formation characteristic (or series of characteristics) as a function of mud (filtration invasion and differing resistivity contrasts in and around the borehole.

For example, in Stelzer, op. cit, the apparent resistivity of a selected synthetic array is determined by linear combination of the normalized synthetic voltage values divided by a quantity productized with a linear combination of the reciprocals of the absolute effective linear distances among the several electrodes. Such results occur only after the synthetic voltages have been calculated based on productizing different sets of current patterns with a previously determined resistance matrix of the formation under study. Moreover, assuming the effective radii of the electrodes of the logging array are negligible, then resistivity can be said to be a direct function of the synthetic voltage entries. But experience indicated that often other factors have a strong effect on array response especially where significant mud filtration invasion and large differing resistivity contrasts in and around the borehole are present.

Figure 8:
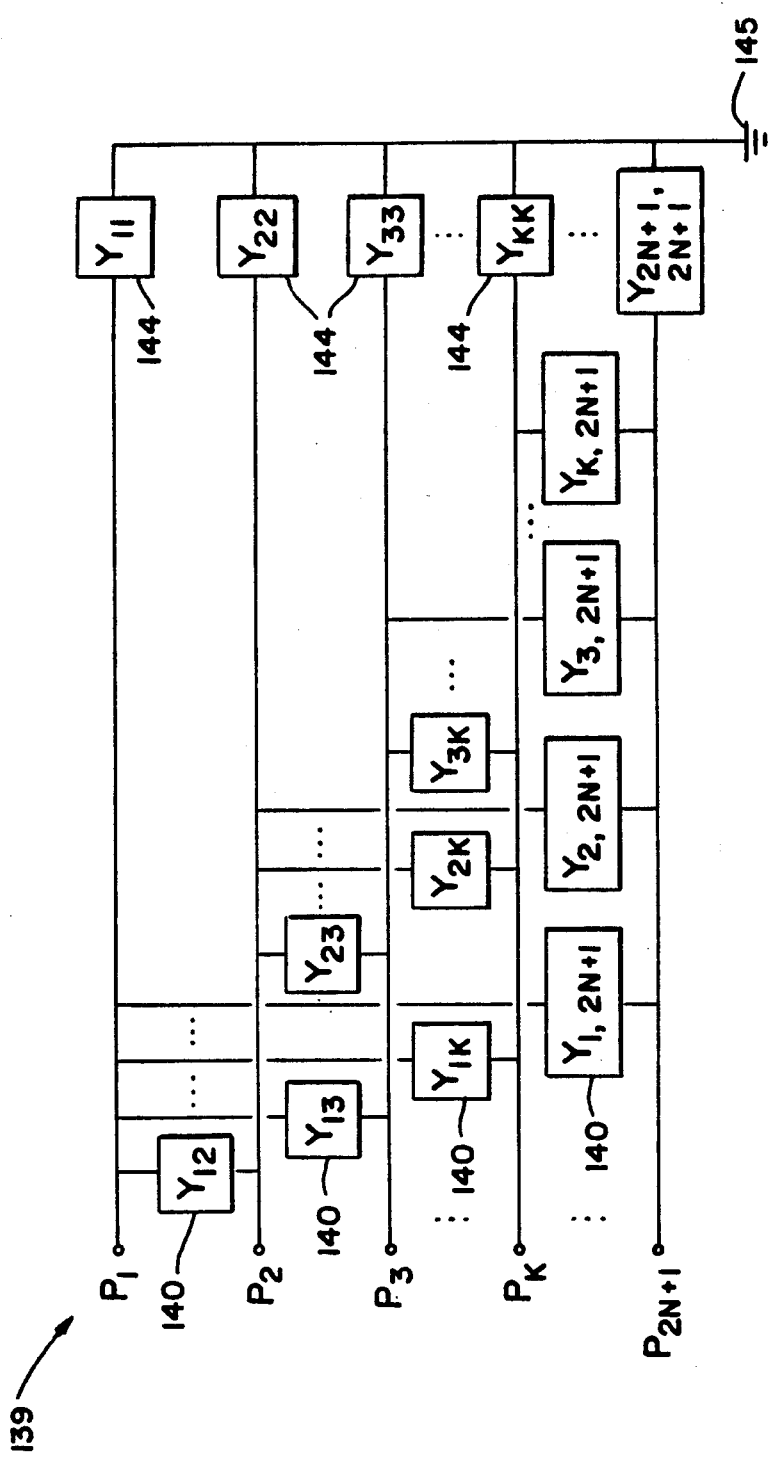
FIG. 8 is an equivalent artificial network simulating an earth formation to illustrate the unique correspondence of the admittances of that network and the reciprocal impedance matrix $\Delta Z^{-1}$ of the present invention.

FIG. 8 is an equivalent artificial terminal network that uniquely simulates an earth formation over an equivalent length equal to M logging stations along a borehole penetrating the formation under study and illustrates the unique correspondence of the admittances of that network and the entries of each reciprocal impedance matrix gather as provided by the electrode array and uphole circuitry of FIG. 1, even where mud filtrate invasion of the formation is significant. That is to say, FIG. 8 shows that each reciprocal impedance matrix gather represents an equivalent terminal network that accurately simulates the earth formation under study even under difficult logging conditions.

As shown, the network comprises an array of lumped admittances 140 and 144 connecting terminals $P_1, P_2, \ldots P_{2N+1}$ with each other and with ground terminal 145, respectively. The terminals of this network correspond to the M logging stations which define the scan interval of interest, with $P_1$ corresponding to upper most station and $P_{2N+1}$ corresponding to the lower most station. The total number of distinct admittances in the net work is $(N+1)(2N+1)$. It follows that if there are M electrode stations over the zone of interest, then there are M $(=2N+1)$ terminals interconnecting the lumped admittances to ground terminal 45.

If arbitrary currents of intensities $J_1, J_2, \ldots J_M$ are applied at the terminals $P_1, P_2, \ldots P_{2N+1}$ and corresponding node voltages are defined as $V_1, V_2, \ldots, V_M$, then application of Kirchoff's law at each terminal provides the following set of equations:

$$J_1 = Y_{1,1}V_1 + Y_{1,2}(V_1-V_2) + \ldots + Y_{1,M}(V_1-V_M)$$
$$J_2 = Y_{2,1}(V_2-V_1) + Y_{2,2}V_2 + \ldots + Y_{2,M}(V_2-V_M)$$
$$\vdots$$
$$J_m = Y_{M,1}(V_M-V_1) + Y_{M,2}(V_M-V_2) + \ldots + Y_{M,M}V_M.$$

where the definition $Y_{i,j} = Y_{j,i}$ is implied.

This set of equations can be rearranged in an obvious manner to yield the following system:

$$J_1 = Y_1 V_1 - Y_{1,2}V_2 - \ldots - J_{1,M}V_M$$
$$J_2 = -Y_{2,1}V_1 + Y_2 V_2 - \ldots - Y_{2,M}V_M$$
$$\vdots$$
$$J_M = -Y_{M,1}V_1 - Y_{M,2}V_2 - \ldots + Y_M V_M$$

where the diagonal terms of the matrix are obtained by summing all connecting admittances from the terminal corresponding to the given row (or column), that is, $$Y_p = Y_{p,1} + Y_{p,2} + \ldots + Y_{p,M}, \quad p=1,2,\ldots,M.$$

For simplicity and clarity of notation in what is to follow, let the coefficients $Y_i$ and $Y_{i,j}$ be further replaced by X's according to the following scheme, i.e., let $$X_{i,j} = -Y_{i,j}, \text{ i not equal j;}$$

$$X_{i,i} = Y_i;$$

so that the above system of equations can be rewritten conveniently as follows:

$$J_1 = X_{1,1}V_1 + X_{1,2}V_2 + \ldots + X_{1,M}V_M$$
$$J_2 = X_{2,1}V_1 + X_{2,2}V_2 + \ldots + X_{2,M}V_M$$
$$\vdots$$
$$J_M = X_{M,1}V_1 + X_{M,2}V_2 + \ldots + X_{M,M}V_M$$

This set of equations relates the absolute voltages; however, it is desired to put them in a form involving difference voltages between adjacent terminals. Toward this end, and following the notation used earlier, it is possible to express these difference voltages $\Delta V_j$ according to the relations $$\Delta V_j = V_j - V_{j-1}, \quad j=2,3,\ldots,M$$

$$V_p = V_1 + \Delta V_2 + \Delta V_3 + \ldots + \Delta V_p, \quad p=2,3,\ldots,M$$

This, in turn, allows the above system of equations to be rewritten as follows:

$$J_1 = U_{1,1}V_1 + U_{1,2}\Delta V_2 + \ldots + U_{1,M}\Delta V_M$$
$$J_2 = U_{2,1}V_1 + U_{2,2}\Delta V_2 + \ldots + U_{2,M}\Delta V_M$$
$$\vdots$$
$$J_M = U_{M,1}V_1 + U_{M,2}\Delta V_2 + \ldots U_{M,M}\Delta V_M$$

where $$U_{p,q} = X_{p,q} + X_{p,q+1} + \ldots + X_{p,M}, \quad p,q=1,2,\ldots,M$$

The preceding system of equations gives the desired result, i.e., in matrix notation we have the following form:

$$J = U * \Delta V$$

where $$\Delta V^T = (V_1(V_2 - V_1)(V_3 - V_2) \ldots (V_M - (V_{M-1})))$$

and the elements of the matrix U are simple, unique linear combinations of the lumped parameter circuit admittances $Y_{i,j}$ (through the X's).

Therefore, assuming the inverse of the modified impedance matrix $\Delta Z$ provided by the logging array of FIG. 1 exists, then from the relation $$U = \Delta Z^{-1}$$

the admittances $Y_{i,j}$ can be uniquely determined to bring the equivalent circuit into a one-to-one correspondence with the reciprocal (inverse) of the modified impedance matrix.

This means that discussion of the various properties of the logging array can be carried out in terms of the equivalent network. That is, in accordance with the present invention the perfect and unique correspondence of the admittance matrix of the network of FIG. 8 and the reciprocal impedance matrix provided by the apparatus of FIG. 1, can be used in the following manner to provide a systematic method of determining a series of response characteristics whereby filtrate invasion and differing resistivity contrasts in and around the borehole are taken into account. That is to say, the present invention describes a method of synthesizing the true response characteristics of a combination of different hole-centered electric logging tools in a variety of difficult borehole conditions as provided by (1) determining impedance values of an earth formation penetrated by a borehole filled with a drilling mud of resistivity (Rm), and (2) selectively manipulating the resulting admittance values as entries of a reciprocal matrix so as to synthesize operations of different hole-centered tools over an associated depth increment with surprising accuracy, wherein each of said reciprocal impedance matrices is associated with a matrix gather indexed to one of a series of finite, overlapping depth scan increments of the formation measured along the borehole. Each scan increment is dependent on the array length L of the electrode array to define shallow and deep depth markers as well as being centrally indexed to the depth in the borehole of a mid-central electrode assembly of the array at the time of data collection.

In order to provide a true indication of the formation resistivity (Rt) even though the formation is interspaced from the borehole by an invaded zone of resistivity (Rxo) of unknown lateral extent due to drilling mud filtrate invasion, the method of the present invention specifies the following steps:

(i) first, an array of hole centered M electrode assemblies of equal incremental electrode spacing "a", is calibrated to obtain sets of calibration factors normalized to known voltage initiation patterns in a known resistivity zone of response, said electrode assemblies having a known internally ordered numbering index and each comprising a current electrode and a potential electrode, said sets of calibration factors each being addressable as a function of borehole conditions including said difficult borehole conditions as well as by synthetic computer focused array type;

(ii) next, a field array is positioned in the borehole comprising sequentially activated shallow and deep end electrode assemblies each including a current electrode and a potential electrode, and a series of intermediate electrode assemblies comprising a potential measuring electrode only, and wherein the absolute depth of at least one electrode assembly is continuously known with respect to a predetermined depth datum level measured from the earth's surface;

(iii) thereafter, the array is continuously moved along the borehole, and sequentially but rapidly, current from first one and the other of said current electrodes of said shallow and deep end electrode assemblies, of a known value is injected through the drilling mud of resistivity (Rm) and the invaded zone of resistivity Rxo and thence into the formation of resistivity Rt, (iv) during current injection from one and then the other of said current electrodes, the absolute potential at each potential electrode as well as the potential differences between adjacent pairs of potential electrodes, are measured in a rapid manner wherein the potential measurements can be indexed to common logging stations of a series of equi-spaced logging stations located along the borehole having a spacing incremental distance of "a" where "a" is the distance between electrode assemblies;

(v) then impedance values from the measured absolute and difference potential values and their associated injection currents, are calculated, each value being indexed to said known internal indexing numbers of active current and potential electrodes used in the measurements;

(vi) next the impedance values are reindexed into impedance entries of a series of overlapping modified matrix gathers $\Delta Z$, each gather $\Delta Z$ being associated with a predetermined segment of said formation equal in vertical extent to M logging stations, and comprising $M \times M$ impedance entries where M is the largest number of the numbering index of the electrode assemblies comprising said array and in which the ratio of the number of difference impedance entries to absolute entries is about $M-1:1$, (vii) thereafter, each modified matrix $\Delta Z$ is inverted to form a modified reciprocal matrix thereof $\Delta Z^{-1}$ in accordance with conventional matrix inversion techniques;

(viii) then computer focused response parameters are generated using the reciprocal matrix $\Delta Z^{-1}$ of step (vii) in conjunction with the same voltage initiation patterns of step (i);

(ix) finally, sets of calibration factors of step (i) are searched until the products of a particular set of calibration factors and the response parameters of step (viii) for all synthetic tool arrays are essentially a constant whereby the difficult borehole condition is deduced even in the presence of high true resistivity to mud resistivity contrasts and irrespective of the fact that synthetic sets of poential patterns have been used as initiators of the subsequently generated computer focused response parameters.

Having briefly described the invention in the manner set forth above, the steps requiring additional comment will now discussed in more detail below.

STEP (i)

In this step, note that in order to calibrate and array of hole centered M electrode assemblies to a series of calibration factors indexed to different borehole conditions and array response, the number of electrode assemblies of the array must be matched to that used in collecting the logging data in the field. In this instance, M is assumed to be equal to 73, spacing factor "a" is 5 inches, mandrel diameter is 3.75 inches, and borehole diameter is 8 inches. Hence total active array length L is 30 feet. Additionally, different resistivity contrasts and various different filtrate invasion distances must be assumed and sets of calibration factors must be generated with such factors being indexed to different borehole conditions, as well as to normalized voltage initiation patterns and an associated current response thereto.

Specifically, a series of formation to mud resistivity contrasts is first assumed in an eight-inch borehole along with known invasion conditions and characteristic responses of synthetic tool arrays computed by applying appropriate solution techniques to the well-known boundary value problem describing current and voltage patterns in conducting media. In this regard, see V. N. Dakhnov, (1962), "Geophysical Well Logging", translated by G. V. Keller, Quarterly of the Colorado School of Mines, Vol. 57, No. 2, Chapter 3.

In this context, the configurations of the tool array are based on the assumption that the basic array comprises M equally spaced electrode assemblies and they can be driven by a series of voltage initiation patterns to provide current response in the presence of differing mud-to-formation contrasts.

Next, sets of calibration factors for all such voltage initiation patterns for the M assemblies are determined so the product of the calculated responses and the set of calibration factors is equal to the desired characteristic resistivity generally taken as $R_t$.

The maximum number of sets of calibration factors is directly related to the number of differing array combinations in accordance with $$K=(M+1)/2$$

where K is the maximum number of stored sets of calibration factors per array combination and M is the number of electrode assemblies.

If it is assumed in this regard that the calibration factors are designated by the symbol $k_q$, then the results set forth above are defined by a series of relations of the form $$Ra_q = k_q R_q, \quad q=1,2,\ldots, N+1=K$$

where $Ra_q$ now represents the apparent resistivity response of the assumed formation and $R_q$ is the calculated raw resistance valve. The calibration factors can then be determined by setting $$Ra_q = R_t, \quad q=1,2,\ldots, N+1$$

for example, to give the desired resistivity response for the particular formation.

In accordance with the present invention, the desired synthetic tool arrays can be described by assuming that the network of FIG. 8 simulates the formation under study, and that any given tool array to be synthesized is positioned and operated so that initially the mid-central electrode assembly is chosen as the current measuring electrode, i.e., at mid-central assembly (N+1) and the intensity of the current within the adjacent formation of interest is determined when selected sets of potentials exist at the terminals $P_1, P_2, \ldots, P_M$ of the circuit of FIG. 8. The depth dependent responses thus initially will be characterized by the ratio $V_{N+1}/J_{N+1}$, and the current $J_{N+1}$ will be determined from the following relationship:

$$J_{N+1} = Y_{N+1,1}(V_{N+1}-V_1) + \ldots$$
$$+ Y_{N+1,N+1}V_{N+1} + \ldots$$
$$+ Y_{N+1,M}(V_{N+1}-V_M)$$

Note thus that the above determination of the current $J_{N+1}$ involves only the admittance to ground of the (N+1)th terminal of FIG. 8, and the admittances between the (N+1)th terminal and the remaining terminals. Hence, various admittances or combinations thereof can be isolated by imposing appropriate voltage distributions on the electrode assemblies of the array.

For example, assume that a series of linearly independent potential vectors $S_1, S_2, \ldots, S_N, S_{N+1}$, are imposed on the electrode assemblies of the logging array having the distribution depicted in Table IV.

TABLE IV

| $S_1 =$ | $S_2 =$ | $S_3 =$ | ... $S_N =$ | $S_{N+1} =$ |
|---|---|---|---|---|
| 0 | 0 | 0 | 0 | 1 |
| 0 | 0 | 0 | 0 | 1 |
| . | . | . | . | . |
| . | . | . | . | . |
| . | . | . | . | . |
| 0 | 0 | 0 | 1 | 1 |
| 0 | 1 | 1 | 1 | 1 |
| 1 —N+1— | 1 —N+1— | 1 —N+1— | 1 —N+1— | 1 —N+1— |
| 0 | 1 | 1 | 1 | 1 |
| 0 | 1 | 1 | 1 | 1 |
| . | 0 | 1 | 1 | 1 |
| . | . | . | . | . |
| . | . | . | . | . |
| 0 | 0 | 0 | 1 | 1 |
| 0 | 0 | 0 | 0 | 1 |

LEGEND:
$S_1$ contains 1-unit potential value
$S_2$ contains 3-unit potential values
.
.
.
$S_N$ contains 2N − 1 unit potential values
$S_{N+1}$ contains 2N + 1 unit potential values As shown, each vector is symmetrical about assembly N+1 and has individual unit amplitudes of either ZERO or ONE unit(s). The distribution of ONE's in any M×1 column of any vector $S_p$ is in accordance with $$2p-1 \text{ where } p=1,2,\ldots,N+1$$

Whereas vector $S_1$ has only a single potential of amplitude ONE (at assembly N+1) for a boxcar distribution of 1×1 about the assembly N+1, the vector $S_2$ has a distribution length of three defining a boxcar distribution of 3×1 about the same assembly, while vector $S_3$ has a boxcar distribution of 5×1 at the same place.

On the other hand, for vectors $S_N$, and $S_{N+1}$ where N=36 if M is 73, the boxcar distributions are 71×1 and 73×1, respectively, as shown in Table IV.

As each of the characteristic potential vectors of Table IV is applied, one at a time, starting with the $S_{N+1}$ vector, corresponding current values can be sequentially determined for the synthesized electrode array. For purposes of annotation in accordance with the present invention, the resulting current component is called the measure current for the corresponding potential vector of the designated distribution, viz., called $J(S_{N+1})$ where $S_{N+1}$ denotes the potential vector from which the current is determined. Hence, to calculate the measure current at electrode N+1, starting with $S_{N+1}$ vector, i.e., for identical ONE voltages on all electrode asemblies, the (N+1)th row of the productized admittance matrix and the potential vector yields, $$J(S_{N+1}) = Y_{N+1,N+1}$$

where $J(S_{N+1})$ denotes that the measure current is in response to potential vectors $S_{N+1}$.

The quantity $Y_{N+1,N+1}$ can be referred to as the self-admittance of the (N+1)th electrode assembly in the particular formation of interest.

Similarly, for the potential distribution described by $S_N$, the (N+1)th row of the productized admittance matrix and the vector $S_N$ yields $$J(S_N) = Y_{N+1,1} + Y_{N+1,N+1} + Y_{N+1,M}$$

and still further, for fector $S_{N-1}$ the (N+1)th row of the productized admittance matrix and the $S_N$ potential vector equals $$J(S_{N-1}) = Y_{N+1,1} + Y_{N+1,2} + Y_{N+1,N+1} + Y_{N+1,M-1} + Y_{N+1,M}$$

The pattern is easily discerned; that is, each measure current is simply the sum of the self-admittance of electrode N+1 plus all admittances connecting it to other electrodes having zero potential (based on ZERO'S in the distribution order of the potential vector). It easily follows that the general expression for measure current is given by $$J(S_q) = Y_{N+1,N+1}, \quad q = N+1,$$

and $$J(S_q) = \sum_{i=1}^{N-(q-1)} Y_{N+1,i} = \sum_{i=q}^{N} Y_{N+1,i+N+1} + Y_{N+1,N+1}, \quad q = 1,2,\ldots,N$$

Since the distribution of the characteristic potential vector is such that all nonzero components have a ONE value, the reciprocal of the measure currents $J(S_q)$ can be equated to resistance of the earth formation for which synthesization is occurring, viz., so that $$R_q = 1/J(S_q)$$

and $$R_1 < R_2 < R_3, \ldots R_{N-1} < R_N < R_{N+1}$$

The resistance inequalities are based on the fact that with increasing index q of the earth resistance $R_q$, which represents the response of the qth synthesized tool array, fewer current paths are involved along with fewer short length paths so that deeper lateral response results. That is to say, the increasing orders of $R_q$ represent successive, increasing orders of deeper response within the formation being modeled. Furthermore, for a series of $R_q$'s, sets of response parameters can, in turn, be calculated. Result: the interpreter is provided with a systematic method by which formation resistivity and depth of invasion of drilling mud in and around the borehole based on such characteristics, can be easily determined.

Figure 9:
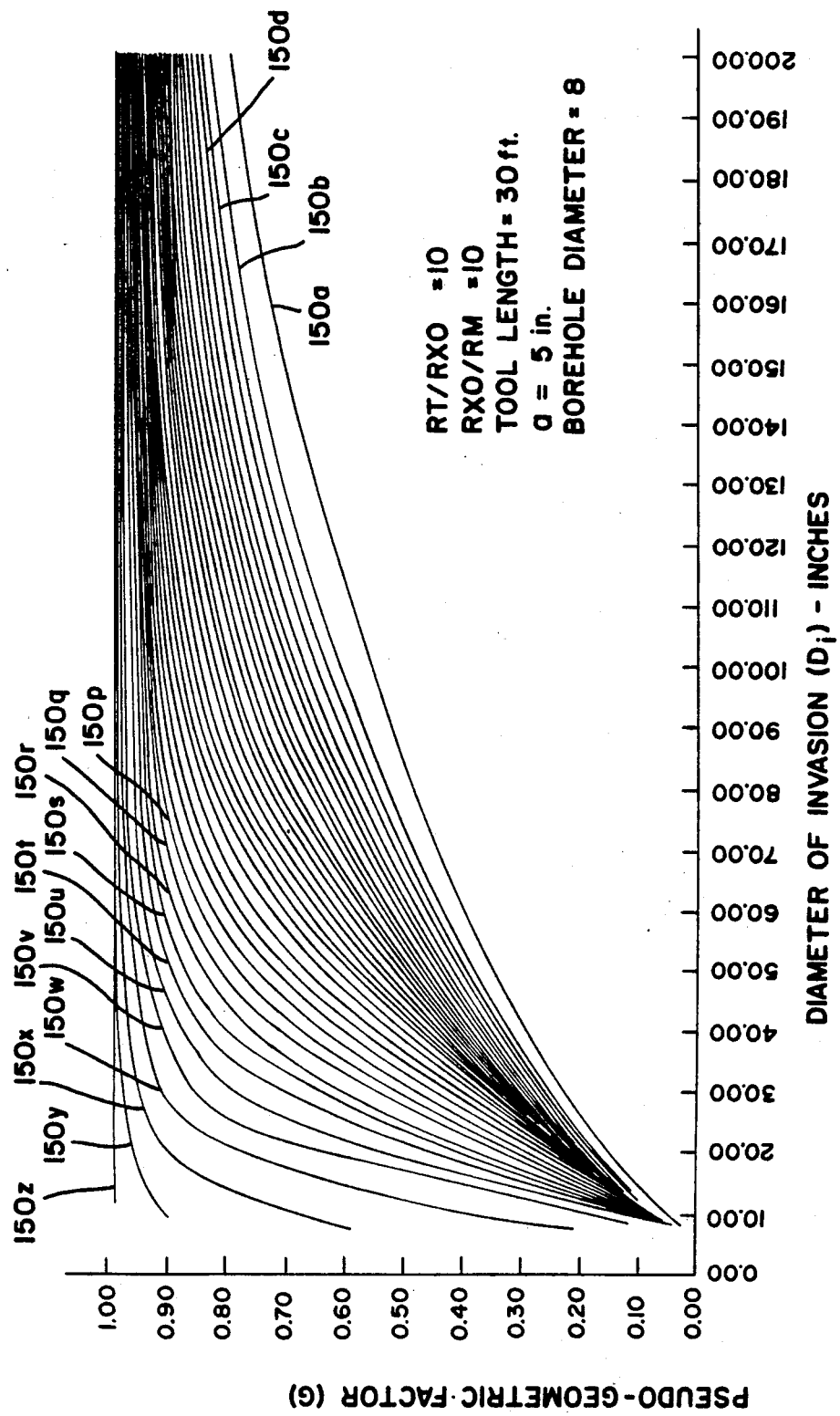
FIG. 9 is a plot of pseudo-geometric factor for different computer focused arrays as a function of diameter of invasion using a normalized current response and voltage initiation pattern and a series of known borehole conditions.

FIG. 9 illustrates graphically the relationship between increasing indexing numbers of synthesized tool array response and depth of response from within the surrounding formation.

As shown, pseudo-geometric factor G for different synthetic arrays is shown plotted as a function of diameter of invasion (Di) of a mud filtrate according to the voltage initiation patterns set forth in Table IV. A simple step-profile separates the invaded zone (Rxo) from the uninvaded zone (Rt), as is customary in calculations of this type.

In this regard, pseudo-geometrical factor G is defined as in the usual manner by the relation $$G_q = (Ra_q - Rt)/(Rxo - Rt)$$

where the terms Rt and Rxo are as previously defined. The term $Ra_q$ denotes the apparent resistivity of the synthesized arrays after calibration factors have been chosen. In this example, for purposes of constructing the curves of FIG. 9, constant multipliers $k_q$ where determined such that the apparent resistivity of each array could be made equal to Rt in the situation for which Rt/Rm ratio is 100/1, with an 8-inch borehole and no invasion.

The curves of FIG. 9 clearly show the tendency of the computer-generated responses to the depth selective, with the more slowly increasing curves 150a, 150b ... 150d characterizing the deeper reponses, and the curves 150p, 150q, ... 150z characterizing shallow responses. Note that the curves 150a and 150s approximate the responses of that deep Laterolog (LLd) and the shallow Laterolog (LLs), respectively, logs covered by marks owned by, as well as being the product of focused tools serviced by Schlumberger, Inc., Houston, TX., presently in common use in the electric logging art. Such curves 150a and 150s, together with the additional curves of FIG. 9 demonstrate the superiority in coverage and resolution of the method of the present invention.

FIGS. 10-28 are plots of calibration factors versus a series of different resistivity contrasts illustrating how sets of such factors are unique to a selected borehole condition.

Figure 10:
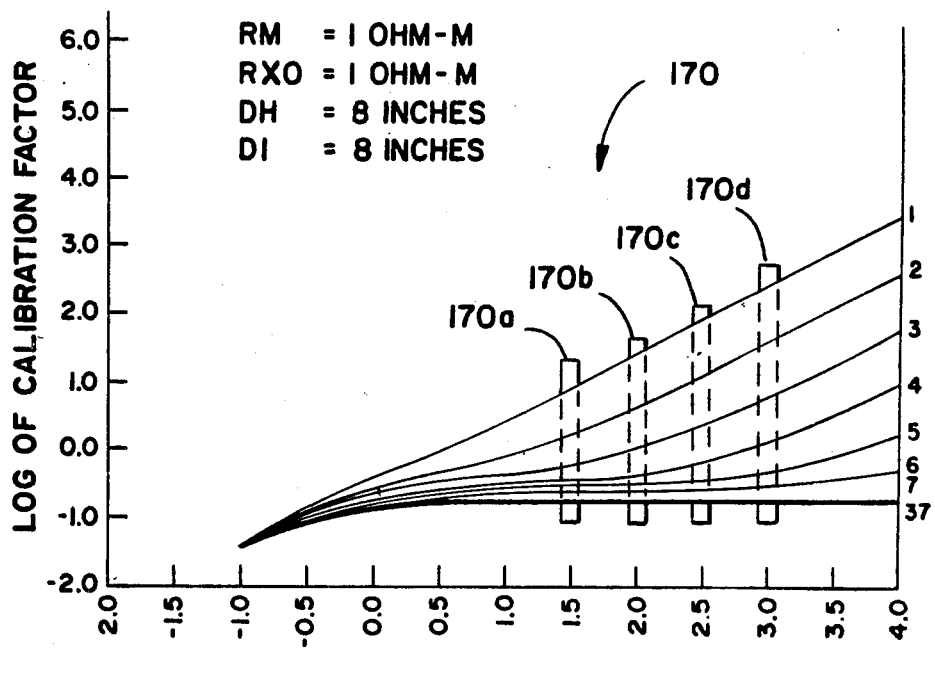
FIGS. 10-28 are plots of calibration factors versus resistivity contrasts illustrating how sets of such factors are unique to a selected borehole condition so as to allow detection thereof in accordance with the method of the present invention.

In this regard, the curves of FIG. 10 cover a very simple case which serves to illustrate the concept. In the FIG. a series of curves 170 is depicted of logarithmic calibration factor ($k_q$) versus the logarithm of the ratio Rt/Rm. The model formation on which the calculations are based consists simply of an 8-inch borehole in an otherwise homogeneous medium. that is, there is no invasion. Furthermore, the array length is 30 feet and electrode assembly length is M where M is 73).

In more detail, curves 170 indicate that there exists sets of calibration factors, such as sets 170a, 170b, 170c ... that can be uniquely associated with formation parameters of interest. For this very simple illustrative case, of course there is only one parameter of interest, namely, Rt, which can be uniquely determined if the mud resistivity Rm is known. Note also that the right-hand ordinate is labeled with integers 1 through 37 representing the shallowest reading and deepest reading tools of the previously described array that have been synthetically simulated using the patterns of response and initiation set forth in Table IV. The calibration factors, $k_q$, have been calculated based on the following assumption: if the raw tool responses, i.e., the $R_q$'s, are given in a known resistivity contrast, then their product with the $k_q$'s (which correspond to the known resistivity contrast) will provide apparent resistivities which are exactly equal to the corresponding Rt in an 8-inch borehole. Clearly then, if raw data are available for an unknown condition, that is, if $R_q$'s are available from an earth formation which is thought to be uninvaded, for this situation one need only search the curves of FIG. 10 to determine that set of calibration factors which cause the resulting apparent resistivities to all be equal to some constant value, thereby deducing the borehole condition, i.e., Rt.

In this regard, it is seen that beyond contrasts of 1/1 (log contrast entry equal to 0.0), the responses of the deeper reading computer focused tools say for tool indices of 10-37, have calibration factors that are not strongly dependent on contrast. On the other hand, the responses of the shallow reading computer focused tools indicate the presence of calibration factors which are strongly dependent on contrast.

FIGS. 11-28 indicate further the interpretational aspects of the present invention, say under borehole conditions involving increasing degrees of mud filtrate invasion.

If it is desired to account for simple invasion in the formation model on which the calibration factors are to be based, then the number of parameters is increased, i.e., the calibration factors now will depend on not only Rt, but also on Rxo, Di and Rm, for fixed borehole diameter. For such a situation the curves of FIGS. 11 through 28 are representative, being plots of calibration factor (logarithmic) versus the logarithm of the ratio Rt/Rxo for various diameters of invasion (step-profile). Note the ratio of Rxo to Rm is fixed at 10/1. Such curves then represent a data base which can be used in the manner indicated above to deduce the invasion characteristics of the formation. That is, the borehole condition is deduced by searching the calibration factors to determine that set which, when multiplied by the corresponding raw responses, gives apparent resistivities which are all equal to the same constant value, the calibration factors having been determined in such a way as to yield the value of Rt in such a circumstance.

Somewhat more generally then, the method assumes the generation of a data base in which sets of calibration factors associated with different borehole conditions (akin to sets 170a, 170b, ... of FIG. 10, or more generally sets of the type contained in FIGS. 11 through 28) have been calculated for a particular configured logging array by which impedance matrix entries are to be obtained in the field. In this regard, the 73-electrode array has previously been indicated as being the normal tool configuration for field operations. Assume also that such sets of calibration factors can be stored in a series of factor tables indexed by tool indices 1–37 associated with unit boxcar patterns of $1 \times 1$, $3 \times 1$, $5 \times 1$, $7 \times 1$ ... $71 \times 1$ and $73 \times 1$, respectively, within the digital computer of the controller-processor 17 of FIG. 1. Such tables are indexed such that entries in the tables are annotated by tool configuration and current response and voltage initiation pattern, i.e., wherein tool configuration has been fixed in accordance with the distribution of the potential vectors about the array, in the manner previously discussed. To repeat, such table entries, viz., the calibration factors, must take into account a variety of different borehole and formation conditions, say under varying invasion conditions as well as under non-invaded conditions previously mentioned.

STEPS (ii)–(vi)

After the series of calibration factor tables has been generated wherein the sets of calibration factors are addressed and annotated as set forth above in accordance with the method of the present invention, the logging array of the present invention is located in the borehole 8 of FIG. 1. Next logging of the formation in the manner previously described occurs resulting in a series of modified impedance matrix gathers $\Delta Z$'s being generated, each being associated with a predetermined segment of the earth formation under study. As previously indicated each matrix gather comprises $M \times M$ entries where M is the largest numbered electrode assembly of the array. In the example of a 73-electrode array, M is equal to 73.

STEPS (vii)–(ix)

After the modified matrix gathers have been determined, each is inverted to form a modified reciprocal matrix gather $\Delta Z^{-1}$ using conventional matrix inversion techniques. For example, experience has indicated that standard, well-known equation solving techniques, such as Gaussian Elimination, are sufficient to satisfactorily solve the problem of inversion. In this regard, see "Linear Algebra and Its Applications", Gilbert Strang, Academic Press, 1976, for example.

Next, a series of computer generated responses is created using the obtained modified reciprocal matrices $\Delta Z^{-1}$, normalized to particular current response and voltage patterns similar to those used in generating the factor tables of step (i) as previously described. That is to say, using the data provided of the field array, a series of $R_q$ response values is generated, such response values being associated with a formation segment equal to M logging stations along the borehole when logging of the formation occurred. Finally, the obtained $R_q$ values are compared with the factor tables containing the sets of calibration factors. Searching is terminated (indicating the formation parameters of interest) when certain best selection criteria are met. For example, for a given set of $R_q$ values, the series of tables containing the calibration factors are sequentially searched until the productization of a predetermined set of calibration factors within a particular factor table provides the desired result, i.e., wherein the products of the $R_q$ values, and the selected set of calibration factors $k_q$ are constant and equal for all 37 computer focused tool responses. If the output of the search results is in a plot format, with the $Ra_q$ values to be plotted as the ordinate and tool index number 1–37 as the abscissa, then a best fit of data in accordance with the method of the present invention occurs when a given set of calibration factors multiplied against the $R_q$ values ($=Ra_q$) approaches a horizontal straight line. But it should be emphasized that the tables of calibration factors must be augmented by the addition of other formation and/or borehole conditions. In this regard, additional tables can be annotated with the other variables as set forth in FIGS. 11–28.

Figure 11:
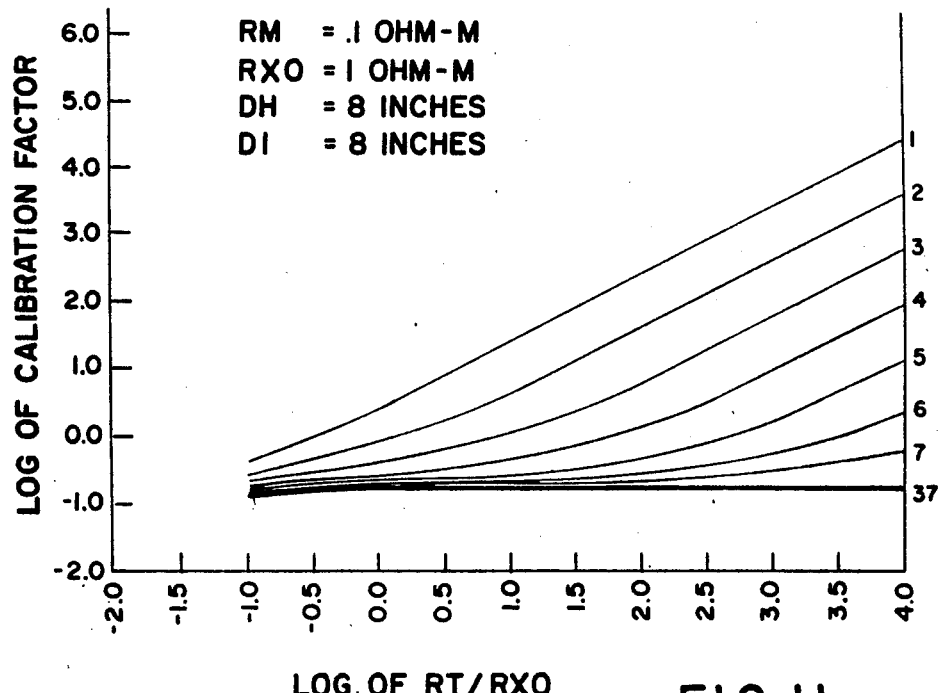
Figure 12:
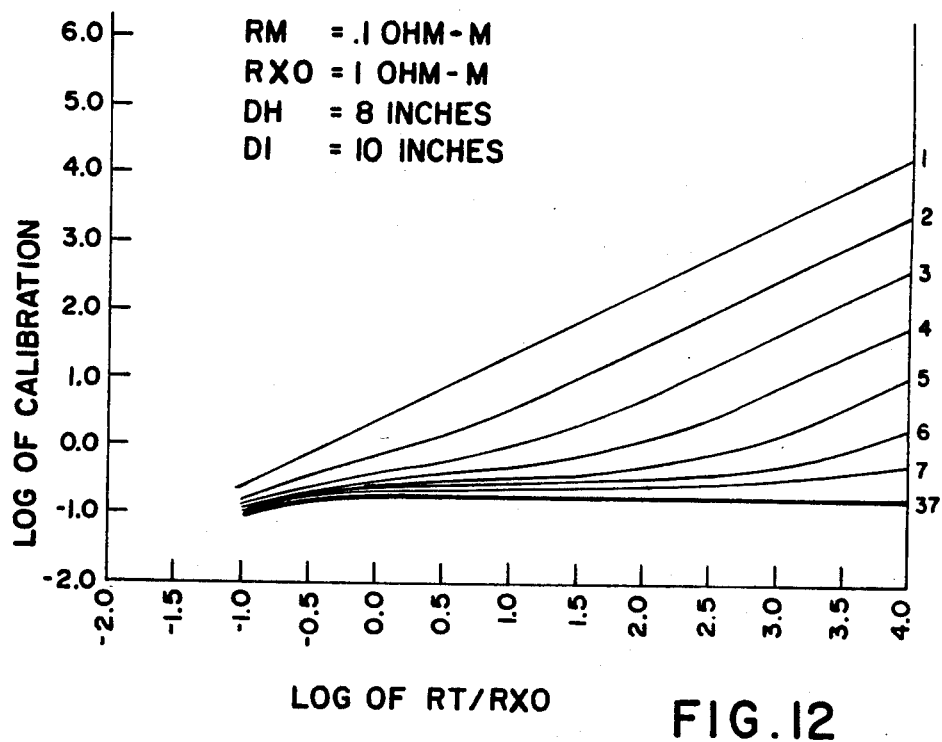
Figure 13:
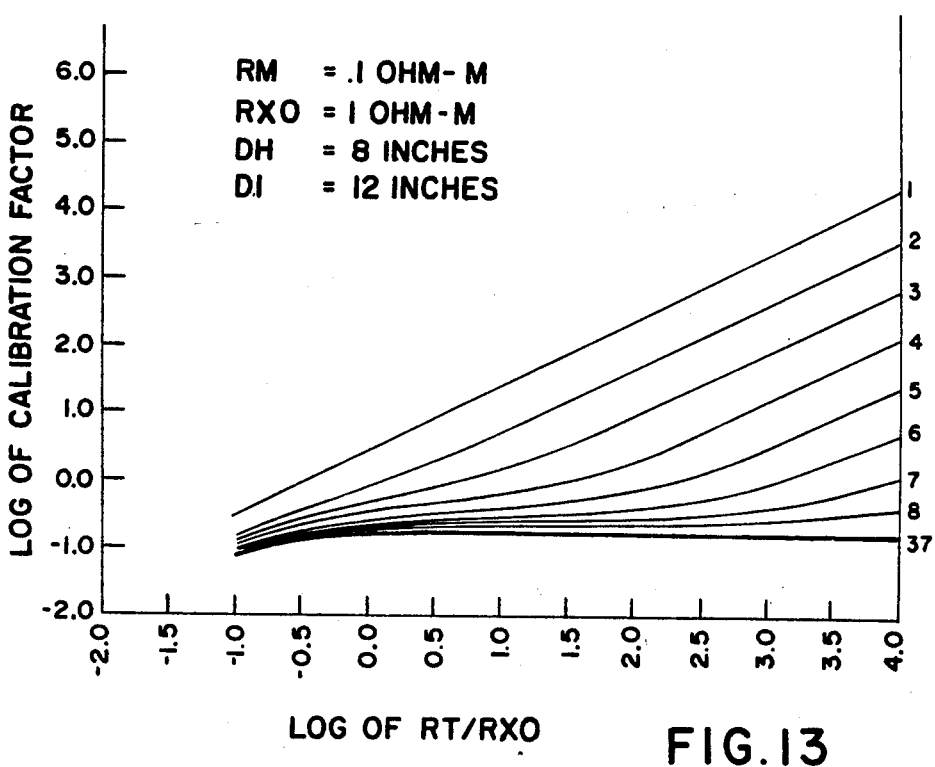
Figure 14:
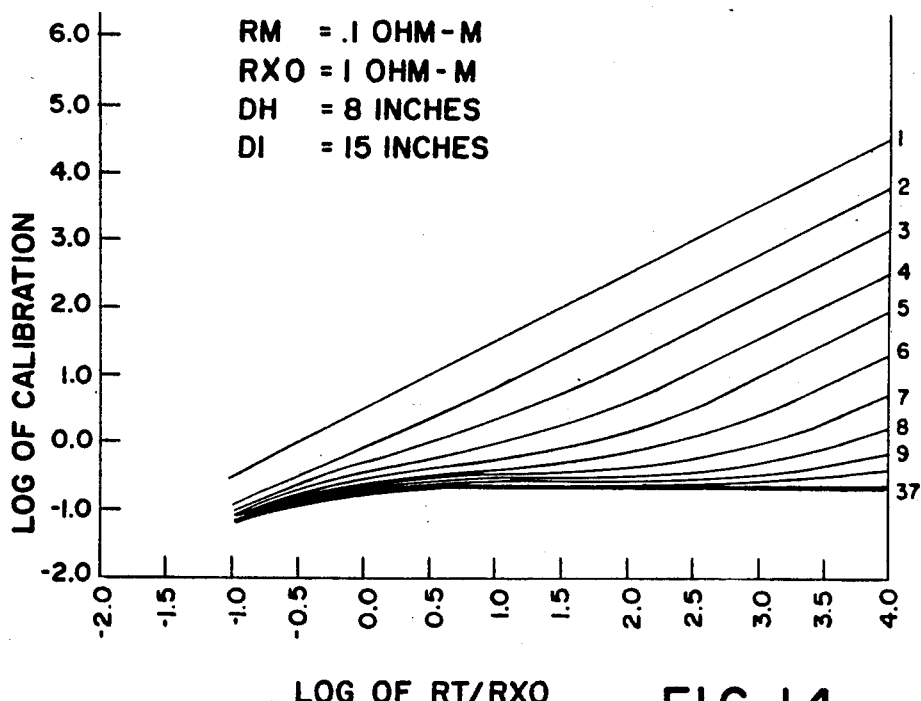
Figure 15:
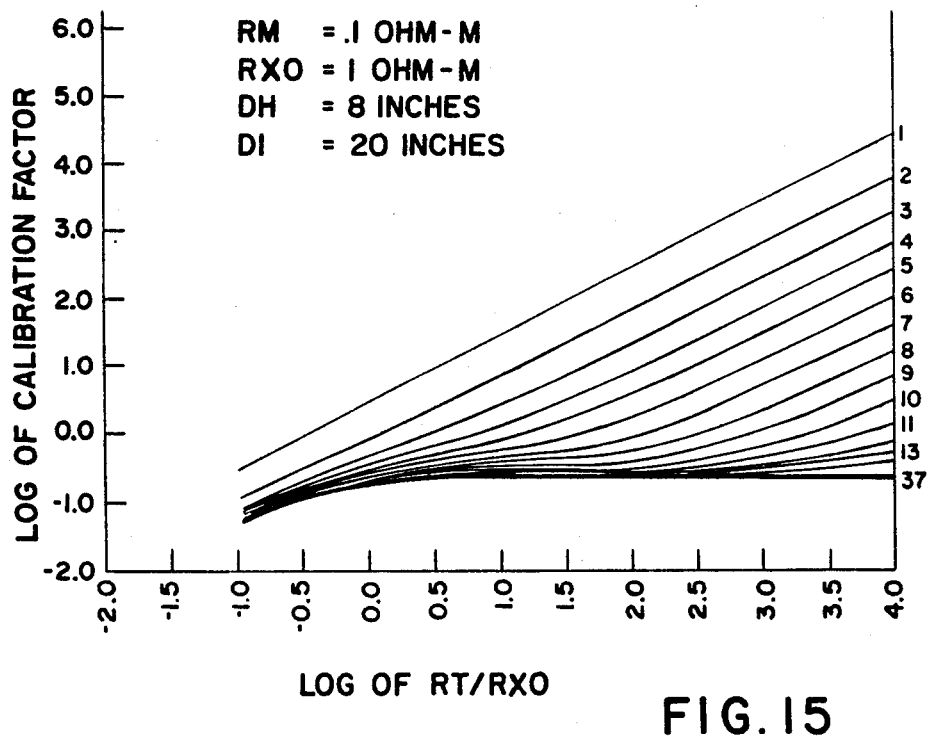

FIG. 11, for example, illustrates that a factor table can be easily constructed for an earth formation having thick beds with a mud resistivity of 0.1 ohm-meter (Rm), and an invaded zone resistivity of 1 ohm-meter (Rxo). The calibration factors are plotted as the ordinate and resistivity contrast of the formation and invaded zone is plotted as the abscissa for an invasion diameter of 8 inches.

Figure 16:
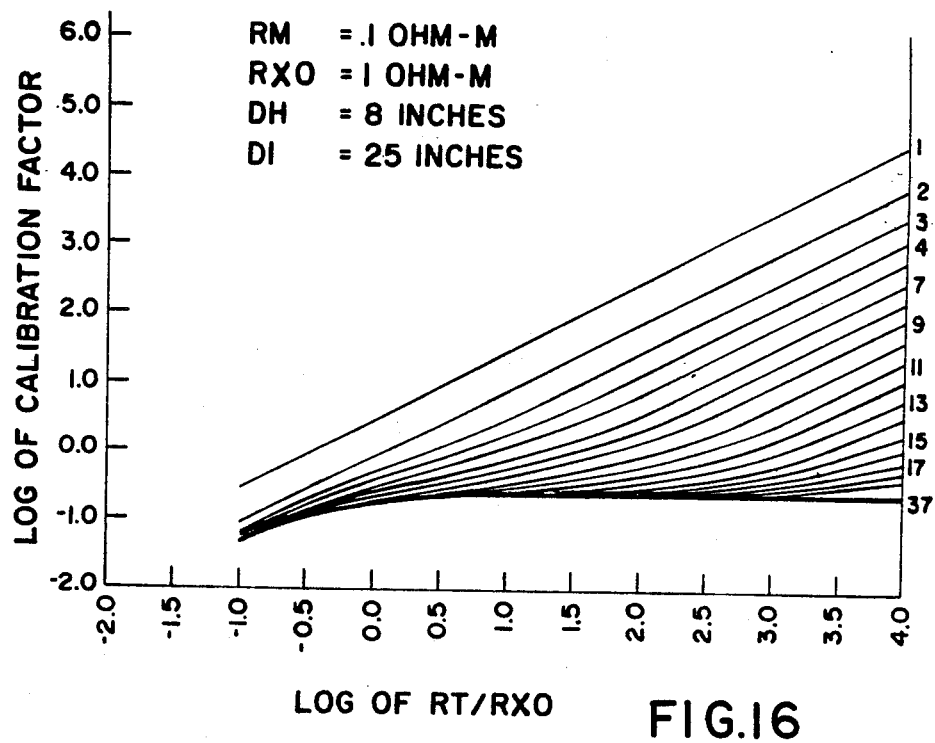
Figure 17:
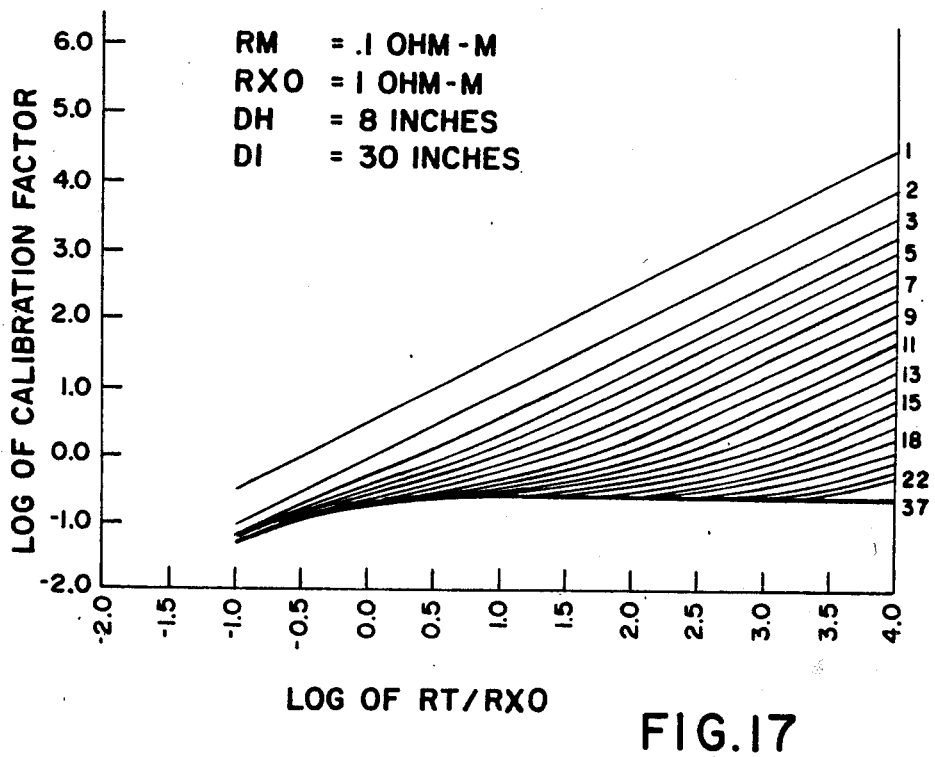
Figure 18:
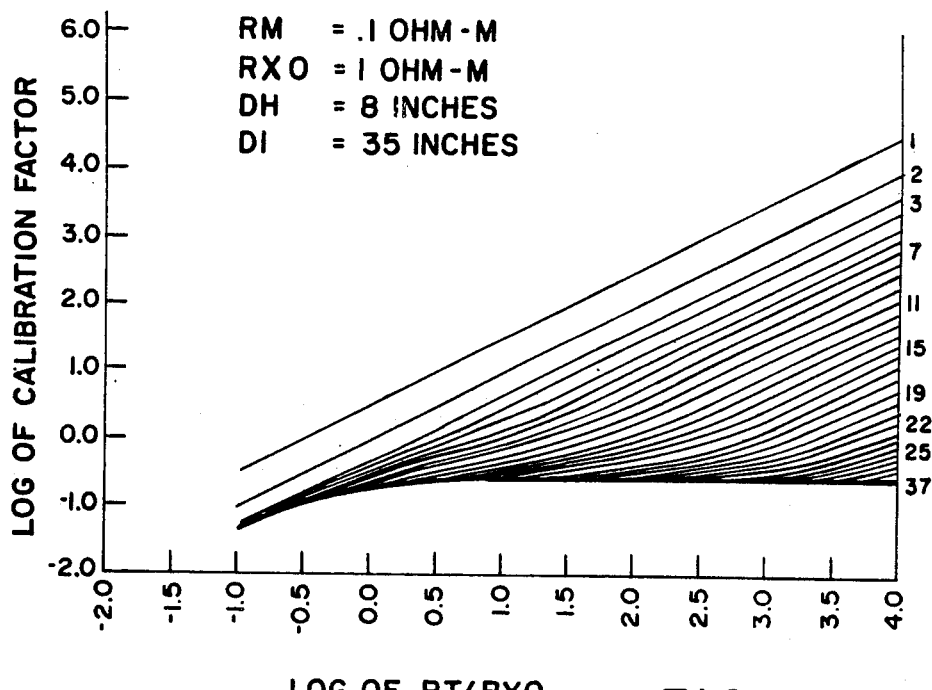
Figure 19:
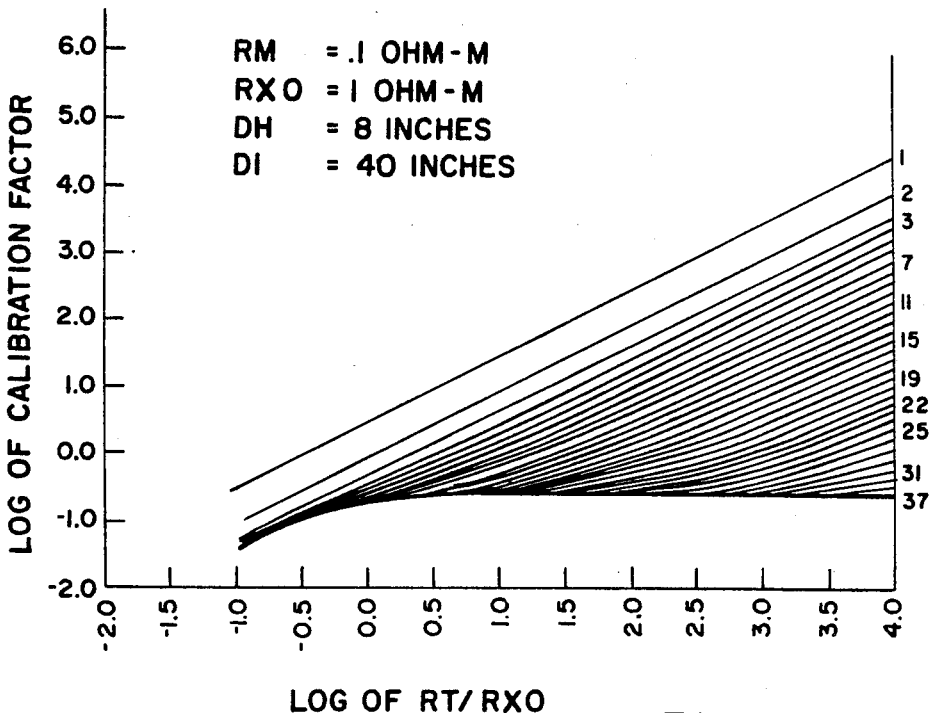
Figure 20:
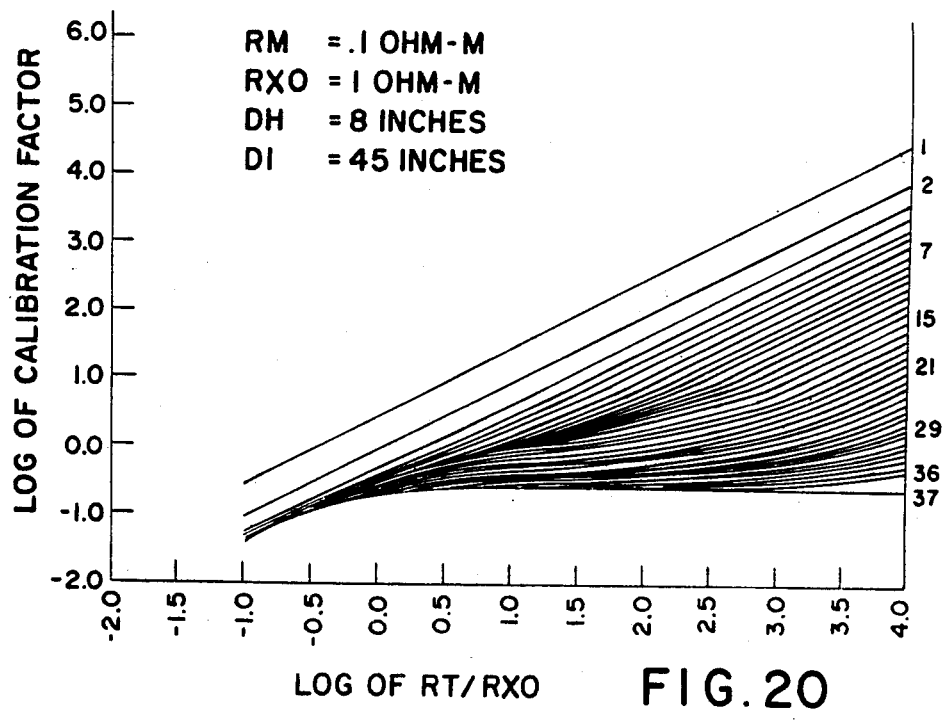
Figure 21:
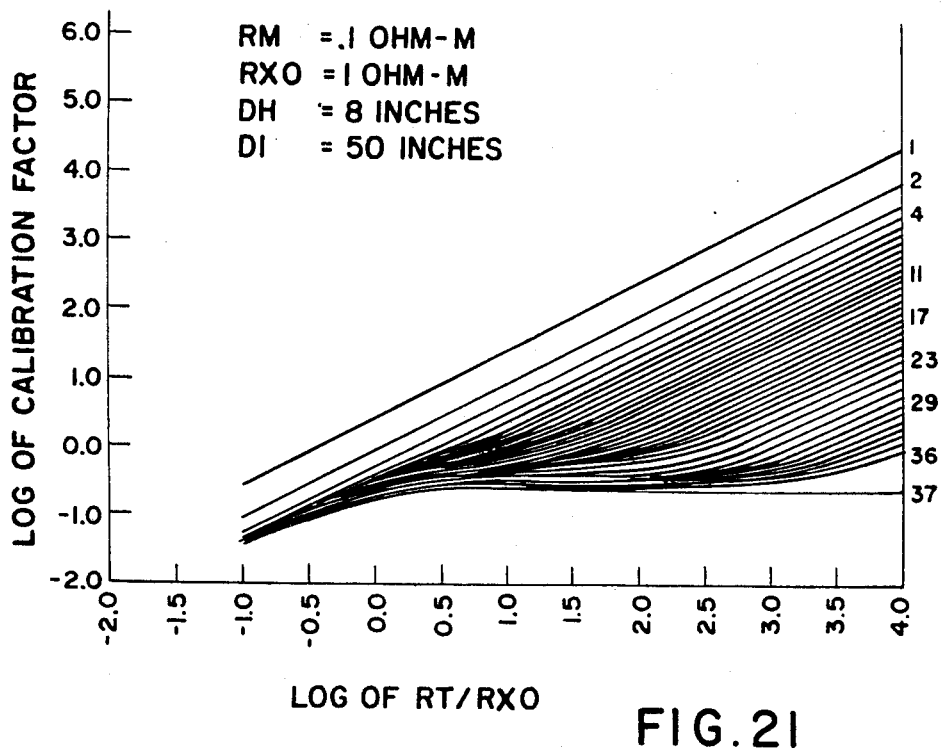
Figure 22:
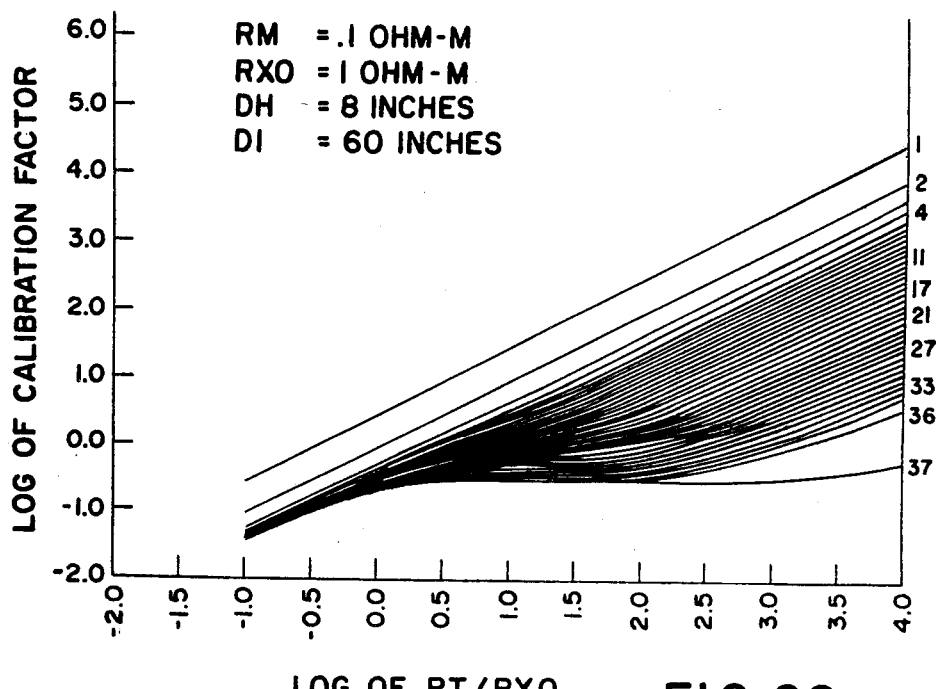
Figure 23:
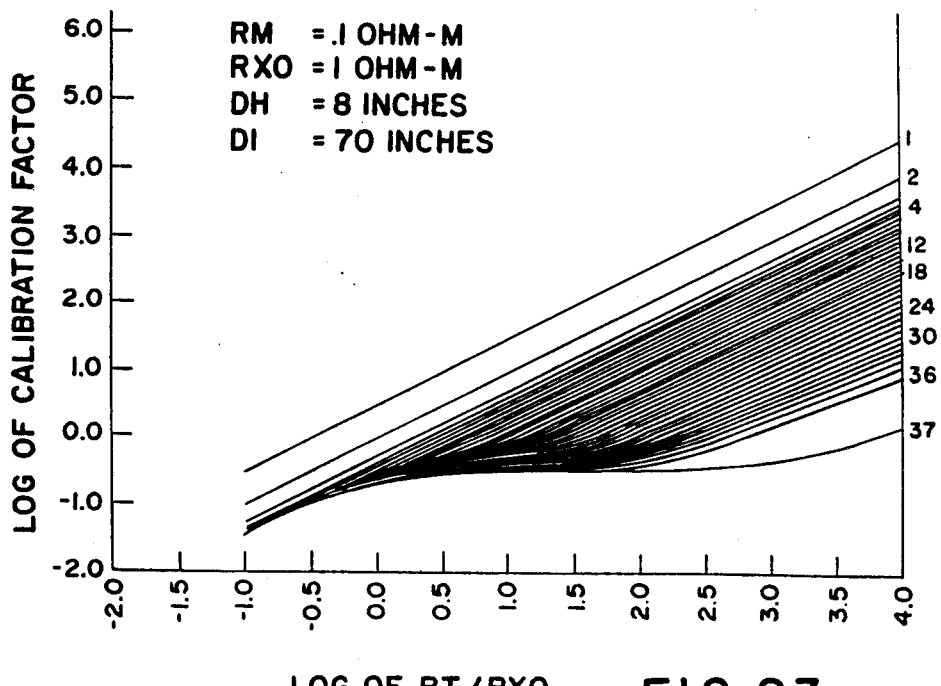
Figure 24:
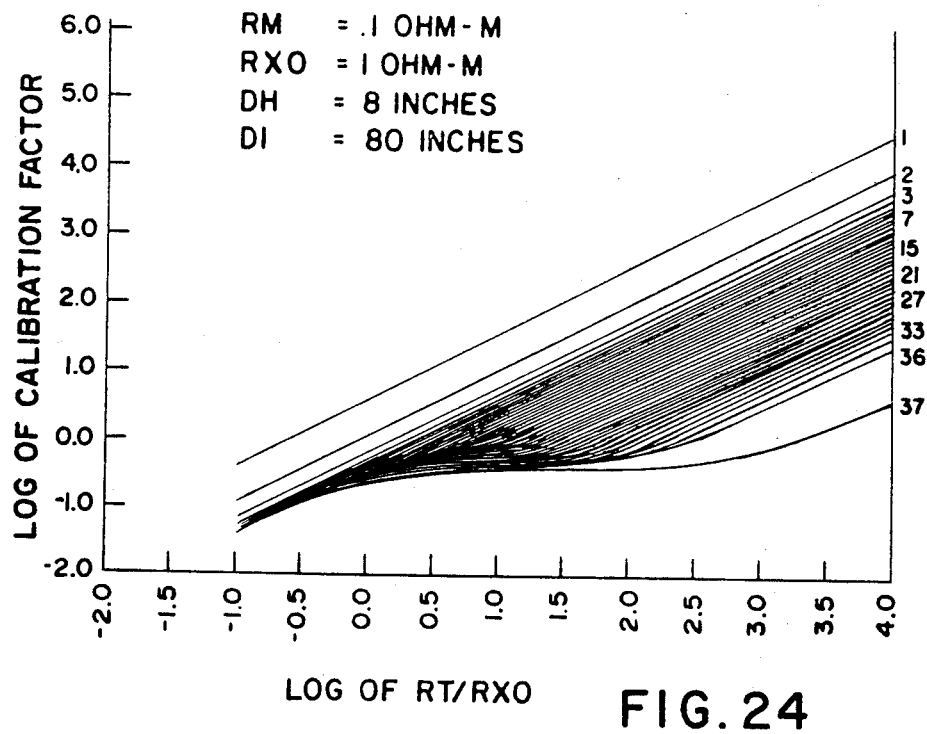
Figure 25:
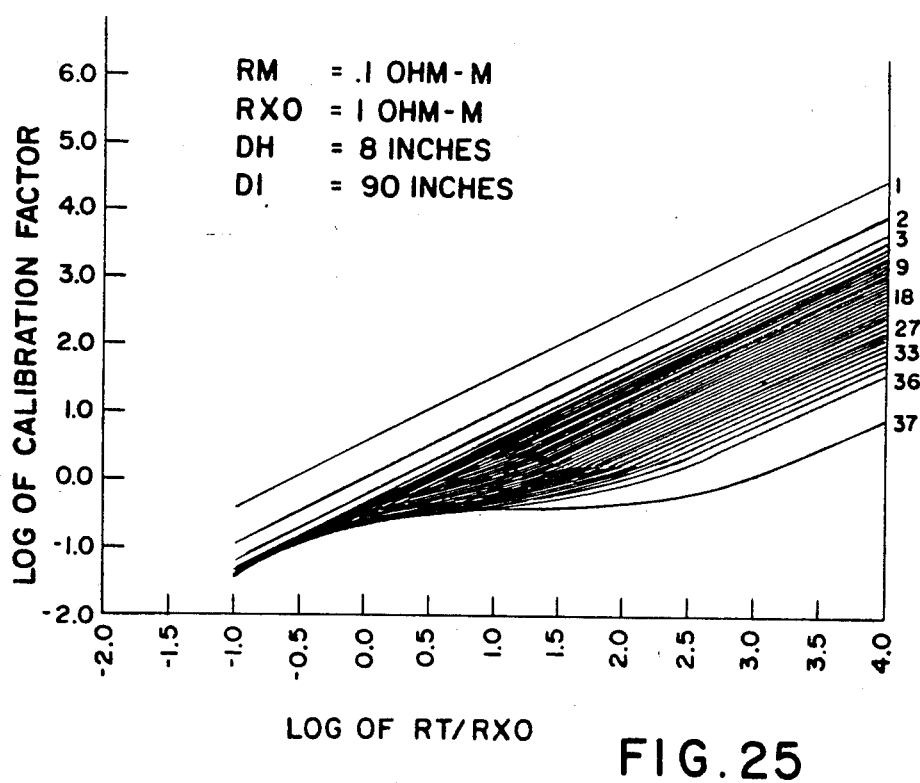
Figure 26:
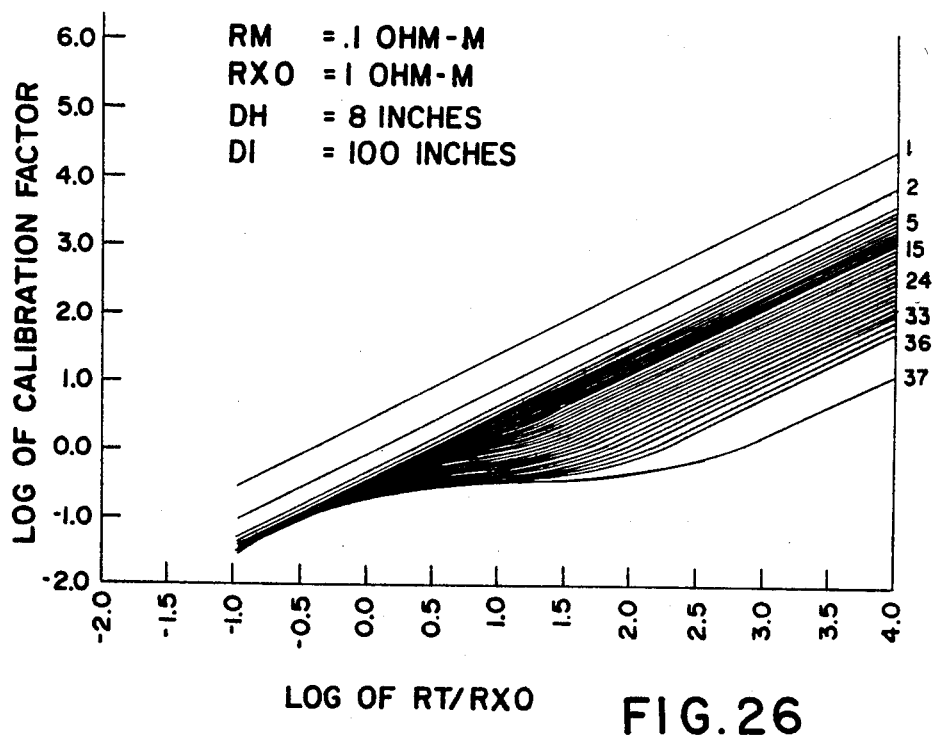
Figure 27:
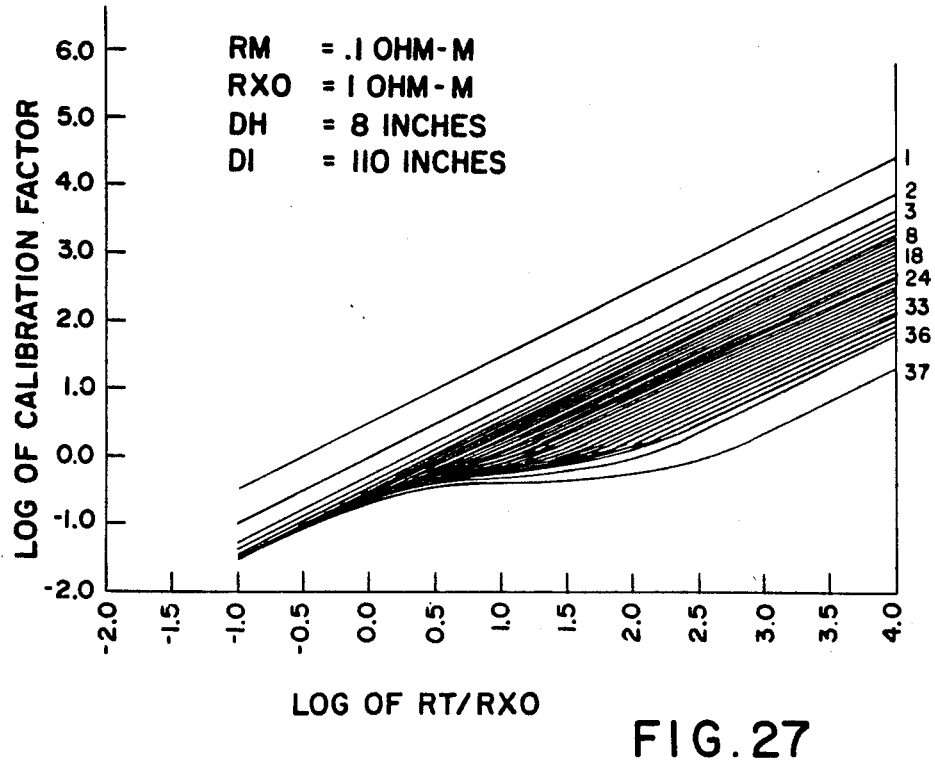
Figure 28:
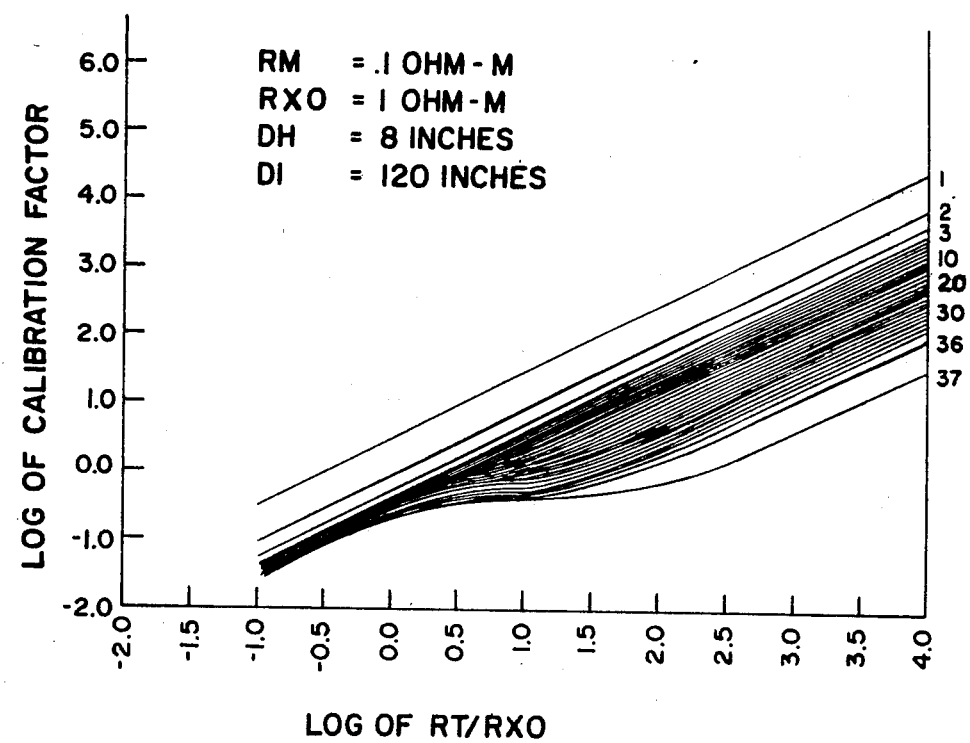

FIGS. 12–28 illustrate how even more factor tables for the same borehole but different formation conditions than that of FIG. 11 can be constructed wherein variations in diameter of invasion $D_i$ are taken into consideration, i.e., where the latter is progressively increased, viz., from 10 inches in FIGS. 12 through 25 inches in FIG. 16 and finally to 120 inches in FIG. 28. Note that for moderate to deep invasion, the plots indicate a strong dependency of the depicted calibration factors on the magnitude of resistivity contrast of the formation and the invaded zone, viz., Rt/Rxo. Also as the lateral distance increases in the FIGS., the responses of the deeper reading computer focused tools play a progressively increasing role and significantly add to the number of calibration factors available in the productization step and hence significantly increases the reliability of the final results. A key to any analysis: the fact that the particular sets of calibration factors for different tool arrays, in combination, can be uniquely tied to formation parameters of interest and thus can be used to provide a surprisingly accurate indication of such parameters.

It is acknowledged that calibration factors are old in the electric logging art. For example, for the conventional focused tools that provide response curves 150a and 150s of FIG. 9, where calibration factors are chosen so that their responses are approximately equal to the true formation resistivity (Rt) in uninvaded formations having formation/mud resistivity contrasts in the range of 10/1 to 100/1 normalized to an 8-inch borehole, it should be noted that such tools are hard-wired. Hence, once their calibration factors are determined, they remain fixed unless a design modification necessitates change, as where a change, for example, occurs in the spacing or size of the electrodes of such tools. But since operating characteristics in accordance with present invention are not design dependent but are readily calculated using the steps of the method of the present invention as set forth above, the latter can be more easily associated with different borehole conditions and hence offer a key to determining formation parameters of interest.

Although preferred embodiments of the invention have been described in detail, it should be understood that the invention is not limited thereto as many variations will be readily apparent to those skilled in the art and thus the invention is to be given the broadest possible interpretation within the terms of the following claims appended hereto.

What is claimed is:

1. Method of synthesizing the true response characteristics of a combination of different hole-centered electric logging tools in a variety of difficult borehole conditions as provided by (1) determining impedance values of an earth formation penetrated by a borehole filled with a drilling mud of resistivity (Rm), and (2) selectively manipulating the impedance values as impedance entries of a matrix so as to synthesize operations of different hole-centered tools over an associated depth increment with surprising accuracy, wherein each of said impedance matrices is associated with a matrix gather indexed to one of a series of finite, overlapping depth scan increments of the formation measured along the borehole, each scan increment being dependent on the array length L of the electrode array to define shallow and deep depth markers as well as being centrally indexed to the depth in the borehole of a mid-central electrode assembly of the array at the time of data collection, and thereby provide a true indication of the formation resistivity (Rt) even though the formation is interspaced from the borehole by an invaded zone of resistivity (Rxo) of unknown lateral extend due to drilling mud filtrate invasion, comprising the steps of:

(i) calibrating an array of hole centered M electrode assemblies of equal incremental electrode spacing "a" to obtain sets of calibration factors normalized to known voltage patterns and associated current responses thereto in a known resistivity zone of response, said electrode assemblies having a known internally ordered numbering index, said sets of calibration factors each being addressable as a function of borehole conditions including said difficult borehole conditions as well as by particular synthetic computer focused array type;

(ii) positioning a field array in the borehole, said array comprising M assmblies but wherein shallow and deep end assemblies each includes current electrodes as well as potential measuring electrodes and wherein intermediate assemblies each comprises a potential measuring electrode only; and wherein the absolute depth of at least one electrode assembly is continuously known with respect to a predetermined depth datum level measured from the earth's surface;

(iii) continuously moving the array along the borehole, and sequentially but rapidly injecting current from first one and the other of said current electrodes of said shallow and deep and electrode assemblies, of a known value through the drilling mud of resistivity (Rm) and the invaded zone of resistivity Rxo and thence into the formation of resistivity Rt, (iv) during current injection from one and then the other of said current electrodes, measuring the absolute potential at each potential electrode as well as the potential differences between adjacent pairs of potential electrodes in a rapid manner wherein the potential measurements can be indexed to common logging stations of a series of equi-spaced logging stations located along the borehole having a spacing incremental distance of "a" where "a" is the distance between electrode assemblies;

(v) calculating impedance values from the measured absolute and difference potential values and their associated injection currents, each value being indexed to said known internal indexing numbers of active current and potential electrodes used in the measurements;

(vi) reindexing the impedance values into impedance entries of a series of overlapping modified matrix gathers, each gather being associated with a predetermined segment of said formation equal, in vertical extent, to M logging stations, and comprising $M \times M$ impedance entries where M is the largest number of the numbering index of the electrode assemblies comprising said array and in which the ratio of the number of difference impedance entries to absolute entries is about $M-1:1$, (vii) inverting each modified matrix gather;

(viii) generating computer focused response parameters using the similar voltage patterns of step (i);

(ix) searching sets of calibration factors of step (i) whereby the difficult borehole condition can be deduced even in the presence of high true resistivity to mud resistivity contrasts and irrespective of the fact that synthetic sets of potential patterns have been used as initiators of the subsequently generated computer focused response parameters.

2. Method of claim 1 in which the array of M electrode assemblies comprises assemblies E1, E2 ... EM and the internal indexing order thereof begins at assembly E1, and ends at assembly EM where E1 is the shallowest assembly of the array and EM is the deepest assembly relative to the earth's surface, and wherein assemblies E1 and EM include current electrodes.

3. Method of claim 2 in which the length L of the array comprising electrode assemblies E1, E2 ... EM, is the vertical distance separating the shallowest electrode assembly E1 and the deepest EM along the borehole.

4. Method of claim 2 in which the length L of the array also defines a zone of formation that is related —by depth— to the calculated impedance entries of each $M \times M$ matrix of step (vi).

5. Method of claim 1 in which the entries of each $M \times M$ matrix comprise M columns and M rows of impedance entries wherein the columns thereof are made up of absolute impedance entries Z's and modified difference impedance entries $\Delta Z$'s and wherein the modified difference impedance entries $\Delta Z$'s, in each column, are each associated with a common depth within the formation associated with instantaneous depth of the activated end current electrode as the data is collected.

6. Method of claim 5 in which each of the columns of each $M \times M$ matrix is associated with a potential electrode whose internal numbering index changes in a known order from row to row along each column.

7. Method of claim 6 in which each of the rows of each $M \times M$ matrix is associated with a potential electrode whose internal numbering index changes in a known order from column to column along each row.

8. Method of claim 5 in which M is 5.

9. Method of claim 8 in which the columns of the $5 \times 5$ matrix are made up of absolute impedance entries Z's and modified difference impedance entries $\Delta Z$s and wherein the columns are provided with a known changing numbering order that begins with 1 and ends with 5 and wherein each of the columns of the matrix has at least one known internally ordered end current electrode from whence originated the drive current by which each impedance entry was calculated, and the rows of the $5 \times 5$ matrix are provided with a changing numbering order that begins with 1 and ends with 5 wherein each of the 5 rows has a common internally ordered current electrode from whence the drive current by which each impedance entry was determined.

10. Method of claim 9 in which the subscripts of the absolute impedance entries, Z's, and the difference impedance entries $\Delta Z$'s, of the $5 \times 5$ matrix for internally numbered assemblies E1, E2, E3 ... E5 are of the following order:

$$\Delta Z(Sd) = \begin{bmatrix} Z1,1(d5) & Z2,1(d5) & Z3,1(d5) & Z4,1(d5) & Z5,1(d5) \\ \Delta Z2,1(d5) & \Delta Z5,1(d6) & \Delta Z4,1(d7) & \Delta Z3,1(d8) & \Delta Z2,1(d9) \\ \Delta Z3,1(d5) & \Delta Z2,1(d6) & \Delta Z5,1(d7) & \Delta Z4,1(d8) & \Delta Z4,1(d9) \\ \Delta Z4,1(d5) & \Delta Z3,1(D6) & \Delta Z2,1(d7) & \Delta Z5,1(d8) & \Delta Z4,1(d9) \\ \Delta Z5,1(d5) & \Delta Z4,1(d6) & \Delta Z3,1(d7) & \Delta Z2,1(d6) & \Delta Z5,1\ d9) \end{bmatrix}$$

where: d5, d6, d7, d8 and d9 are the depth of the activated current electrode as the data is collected.

11. Method of claim 1 in which step (i) is further characterized by generating sets of calibration factors for differing array combinations assuming an array configuration comprising M equally spaced electrode assemblies driven by a series of different voltage patterns, as a function of differing mud-to-formation resistivity contrasts.

12. Method of claim 11 with the addition step of storing the generated calibration factors as a function of mud-to-formation resistivity contrasts and said differing array combinations.

13. Method of claim 12 in which the maximum number of stored sets of calibration factors are related to number of differing array combinations in accordance with:

$$K = (M+1)/2$$

where K is the maximum number of stored sets of calibration factors per array combination.

14. Method of claim 11 in which step (viii) includes multiplying each set of calibration factors of step (i) on a one-by-one basis, by individually response parameters of step (vii) normalized to similar voltage initiation patterns of step (i) to form a series of normalizing values and selecting as a best fit a particular series that contain values of essentially constant magnitude.

* * * * *

UNITED STATES PATENT AND TRADEMARK OFFICE
CERTIFICATE OF CORRECTION

PATENT NO. : 4,677,386
DATED : June 30, 1987
INVENTOR(S) : Carroll W. Chapman and Jorg A. Angehrn It is certified that error appears in the above-identified patent and that said Letters Patent are hereby corrected as shown below:

Column 37, Line 6 "extend" should read -- extent --.

Column 37, Line 20 "assmblies" should read -- assemblies --.

Column 38, Line 15, Claim 3 "deepest EM" should read -- deepest assembly EM --.

Signed and Sealed this

Eighth Day of December, 1987

Attest:

DONALD J. QUIGG

Attesting Officer

Commissioner of Patents and Trademarks